(12) United States Patent
Song et al.

(10) Patent No.: US 11,216,636 B2
(45) Date of Patent: Jan. 4, 2022

(54) ELECTRONIC DEVICE COMPRISING FINGERPRINT SENSOR

(71) Applicant: Samsung Electronics Co., Ltd., Suwon-si (KR)

(72) Inventors: Kyung Hoon Song, Yongin-si (KR); Jeong Hoo Kim, Suwon-si (KR); Sun A Kim, Hwaseong-si (KR); Kwang Sub Lee, Yongin-si (KR); Se Young Jang, Seongnam-si (KR); Chi Hyun Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/762,890

(22) PCT Filed: Oct. 22, 2018

(86) PCT No.: PCT/KR2018/012482
§ 371 (c)(1),
(2) Date: May 8, 2020

(87) PCT Pub. No.: WO2019/093683
PCT Pub. Date: May 16, 2019

(65) Prior Publication Data
US 2021/0174048 A1 Jun. 10, 2021

(30) Foreign Application Priority Data
Nov. 10, 2017 (KR) .................. 10-2017-0149919

(51) Int. Cl.
*G06K 9/00* (2006.01)
(52) U.S. Cl.
CPC ....... *G06K 9/0004* (2013.01); *G06K 9/00046* (2013.01); *G06K 9/00053* (2013.01)

(58) Field of Classification Search
None
See application file for complete search history.

(56) References Cited

U.S. PATENT DOCUMENTS

| 9,710,689 | B2 | 7/2017 | Evans, V et al. |
| 9,823,771 | B2 | 11/2017 | Bae et al. |
| (Continued) | | | |

FOREIGN PATENT DOCUMENTS

| KR | 10-2015-0073539 A | 7/2015 |
| KR | 10-2016-0029698 A | 3/2016 |
| (Continued) | | |

OTHER PUBLICATIONS

International Search Report dated Feb. 15, 2019 in connection with International Patent Application No. PCT/KR2018/012482, 6 pages.

*Primary Examiner* — Joseph R Haley

(57) ABSTRACT

An electronic device is disclosed. According to an embodiment, an electronic device may comprise: a transparent member; a display panel that is disposed beneath the transparent member and comprises multiple pixels and at least one transmission area which is formed between the multiple pixels and through which light can pass; a biometric sensor which is disposed beneath the display panel and can acquire light that has been output through at least some of the multiple pixels, has been reflected by an external object near or in contact with the transparent member, and then has passed through the at least one transmission area; and a light path changing member disposed between the biometric sensor and the display panel and spaced a predetermined distance apart from the biometric sensor, the light path changing member being able to change an optical path with respect to at least a part of the light having passed through the at least one transmission area. Various other embodiments found in the specification are also possible.

14 Claims, 20 Drawing Sheets

(56) References Cited

U.S. PATENT DOCUMENTS

| | | |
|---|---|---|
| 10,116,868 B2 | 10/2018 | Wyrwas et al. |
| 2014/0218339 A1 | 8/2014 | Hotelling et al. |
| 2015/0021627 A1* | 1/2015 | Fujita .................... H01L 31/16 257/82 |
| 2015/0177884 A1 | 6/2015 | Han |
| 2017/0161544 A1* | 6/2017 | Fomani ............. G06K 9/00013 |
| 2019/0080138 A1* | 3/2019 | Gao .................... G02B 3/0031 |
| 2019/0080139 A1* | 3/2019 | Reinhold ............ G06K 9/0004 |
| 2019/0303640 A1 | 10/2019 | Song et al. |

FOREIGN PATENT DOCUMENTS

| | | |
|---|---|---|
| KR | 10-2016-0147943 A | 12/2016 |
| KR | 10-2017-0093192 A | 8/2017 |
| KR | 10-2017-0119623 A | 10/2017 |

\* cited by examiner

ELECTRONIC DEVICE COMPRISING FINGERPRINT SENSOR

CROSS-REFERENCE TO RELATED APPLICATIONS

This application is a 371 of International Application No. PCT/KR2018/012482 filed on Oct. 22, 2018, which claims priority to Korean Patent Application No. 10-2017-0149919 filed on Nov. 10, 2017, the disclosures of which are herein incorporated by reference in their entirety.

1. FIELD

Embodiments disclosed herein relate to fingerprint recognition technology.

2. DESCRIPTION OF RELATED ART

A conventional portable electronic device may support a fingerprint recognition function. The conventional electronic device that provides the fingerprint recognition function may arrange a fingerprint sensor on a lower periphery of a display area or a rear surface of a case of the electronic device, and support the fingerprint recognition function based on the fingerprint sensor.

Recently, as users who prefer a large screen increase, research for increasing a screen size of the portable electronic device has been continuously conducted. For example, the electronic device may be configured to allow the display to occupy most of a front area. Because the electronic device does not have non-display area of the display such as a bezel or the non-display area is small, the fingerprint sensor disposed in the conventional non-display area may be disposed in the display area of the display. In addition, the electronic device may use an optical fingerprint sensor, but not separately place a light source for fingerprint recognition, and the light source included in the display (e.g., backlight unit (BLU), light emitting diode (LED), organic light emitting diode (OLED), or the like) may be used as a light source for the fingerprint sensor.

When an optical fingerprint sensor is disposed in a display area of a display, the fingerprint sensor may detect a fingerprint of a user who touches a front of the display through a hole formed in a part of a rear panel of the display. When the fingerprint sensor is disposed below the display, there is an air gap between the fingerprint sensor and the display, and it may be difficult for the fingerprint sensor to obtain a good signal in a certain environment (e.g., a strong crosstalk environment) due to the air gap as to be required for fingerprint authentication. In addition, the electronic device has a problem in that the display area in which the fingerprint sensor is disposed seems different from a peripheral display area.

Various embodiments disclosed in the disclosure provide an electronic device capable of providing a fingerprint recognition function using a sensor disposed under a display.

SUMMARY

An electronic device according to an embodiment disclosed in the disclosure may include a transparent member; a display panel including a plurality of pixels and at least one transmissive region through which a light is capable of being transmitted between the plurality of pixels, and disposed under the transparent member; a biometric sensor disposed under the display panel and obtaining a light, which is output through at least some of the plurality of pixels, is reflected by an external object close to or in contact with the transparent member, and then is transmitted through the at least one transmissive region; and a light path changing member disposed between the biometric sensor and the display panel to be spaced apart from the biometric sensor by a specific distance and capable of changing an optical path for at least a portion of the light transmitted through the at least one transmissive region.

According to the embodiments disclosed herein, it is possible to improve performance of fingerprint recognition using a sensor disposed under a display. In addition, various effects that may be directly or indirectly identified through the disclosure may be provided.

BRIEF DESCRIPTION OF THE DRAWINGS

With regard to description of drawings, the same or similar components may be designated by the same or similar reference numerals.

DETAILED DESCRIPTION

Figure 1:
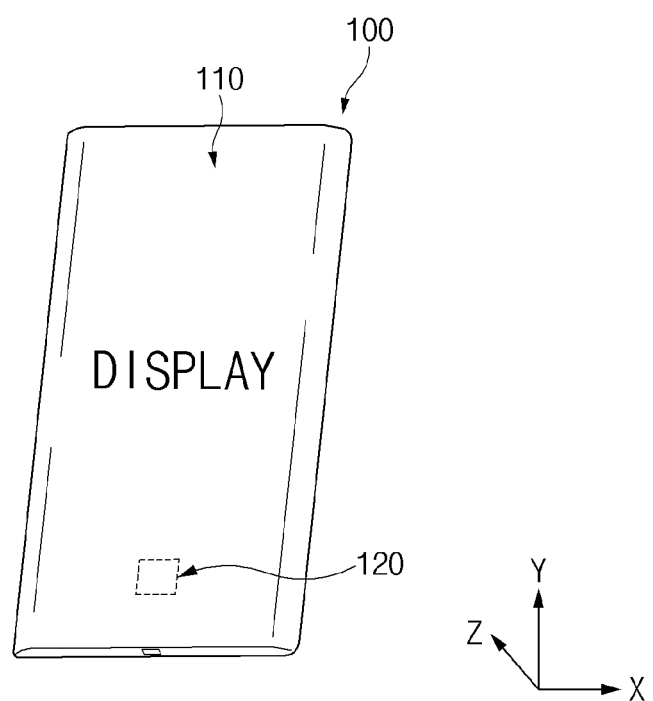
FIG. 1 illustrates an appearance of an electronic device supporting a fingerprint recognition function according to an embodiment.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal meaning unless expressly so defined herein in various embodiments of the present disclosure. In some cases, even if terms are terms which are defined in the specification, they may not be interpreted to exclude embodiments of the present disclosure.

Hereinafter, electronic devices according to an embodiment of the present disclosure will be described with reference to the accompanying drawings. The term "user" used herein may refer to a person who uses an electronic device or may refer to a device (for example, an artificial intelligence electronic device) that uses an electronic device.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

FIG. 1 illustrates an appearance of an electronic device supporting a fingerprint recognition function according to an embodiment.

Referring to FIG. 1, according to an embodiment, an electronic device 100 may be formed, for example, in a quadrangular shape as a whole, and at least a part of corners thereof may be rounded. Further, at least one side surface of the electronic device 100 (e.g., a left surface or a right surface of the electronic device 100) may be provided in an edge type that is gradually curved toward an edge. The electronic device 100 may be provided in a form in which a display module 110 is extended to at least a portion of at least one of top, bottom, or side surfaces (e.g., a front full screen, an edge-to-edge display, or the like).

According to an embodiment, the electronic device 100 may include a fingerprint sensor module 120 that detects a fingerprint of a user in a substantially vertical space (e.g., a display pixel layer or below the display pixel layer) in a thickness direction (a z-axis direction) with respect to at least some of an active area of the display module 110. According to an embodiment, the fingerprint sensor module 120 may have a specified size (e.g., a size corresponding to a technical and statistical size capable of recognizing the fingerprint of the user) and may be disposed on a partial area or an entire area of a rear surface of the display module 110, for example, in a form of a substrate or sheet. According to an embodiment, the fingerprint sensor module 120 may receive at least a portion of a light (e.g., a light reflected by a finger in contact with a surface of the display module 110) irradiated from at least one pixel disposed in the display module 110 to configure image information necessary for fingerprint recognition and may store the configured image information in an internal memory (not illustrated) of the fingerprint sensor module 120 or a memory 1530 of the electronic device 100 to allow a processor (e.g., an AP, DDI, low power processor, or the like) of the electronic device 100 to access the image information.

At least a portion of the display module 110 may be formed transparently. For example, the display module 110 may be provided in a form having a specified transparency (approximately 2 to 5%) for a light of a specific wavelength band (e.g., a wavelength band around 550 nm). Alternatively, the display module 110 may include a region including at least a portion of a region where the fingerprint sensor module 120 is disposed, which is formed transparently. In this regard, the fingerprint sensor module 120 may include a light emitting unit and a light receiving unit, irradiate a light using the light emitting unit in response to control of the processor, receive the irradiated light, and collect the image information necessary for the fingerprint recognition.

As described above, the electronic device 100 having the fingerprint recognition function may collect image information necessary for the fingerprint recognition using the light irradiated from pixels included in the display module 110. In this regard, the fingerprint sensor module 120 may be located below a position where the pixels of the display module 110 are arranged, and collect the light returning through transparent substrates where the pixels are arranged to perform the fingerprint recognition.

Figure 2:
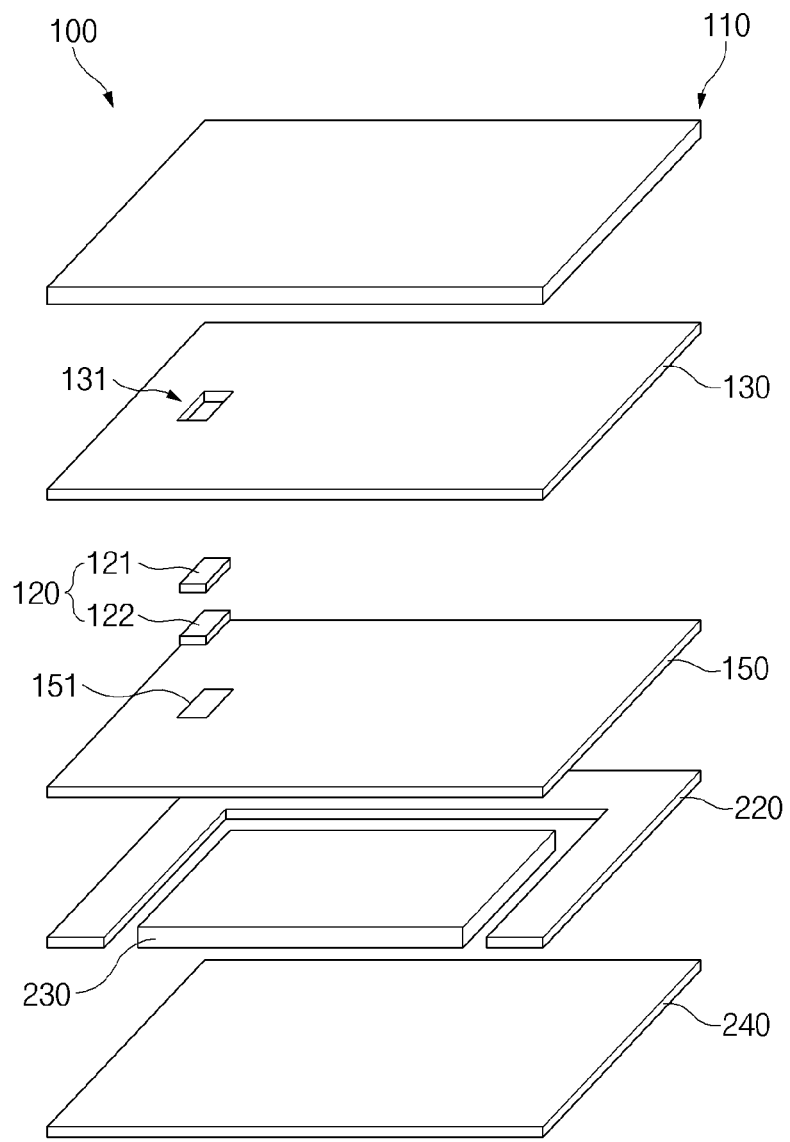
FIG. 2 is an exploded perspective view of an electronic device according to an embodiment.

FIG. 2 is an exploded perspective view of an electronic device according to an embodiment.

Referring to FIG. 2, the electronic device 100 according to an embodiment of the disclosure may include the display module 110, a rear panel 130, a biometric sensor (e.g., a fingerprint sensor module) 120, a printed circuit board 220, a battery 230, and a rear cover 240. Additionally, the electronic device 100 may further include a case provided to surround a side surface of the display module 110. In addition, the electronic device 100 may further include a bracket 150 for fixing the display module 110, the rear panel 130, the printed circuit board 220, the battery 230, and the like. between the rear panel 130 and the printed circuit board 220. The bracket 150 may be provided as a part of a case (e.g., integrated with the case) or may include the case. Herein, the case where the biometric sensor 120 is a fingerprint sensor will be described as an example.

The display module 110 may include a plurality of pixels arranged in a matrix form, wires arranged to supply a designated power to the pixels, and a display driver integrated-chip (DDI) for supplying signals to the wires, and a substrate on which the pixels, wires, and DDI are placed. At least a portion of the display module 110 may be transparently formed (or formed with a specified transparency). For example, the specific transparency (e.g., 2 to 5% at a wavelength of around 550 nm) may be provided between the wires of the display module 110 to allow the light to pass therethrough. The display module 110 may be provided to occupy at least a part of the front surface of the electronic device 100. The pixels disposed on the display module 110 may irradiate light designated under control of the processor or the DDI. The light irradiated from the pixels may be reflected by an object (e.g., a finger) disposed on the front surface of the display module 110 and transmitted through the display module 110 to be transmitted to the light receiving unit of the fingerprint sensor module 120.

The fingerprint sensor module 120 may be disposed below the rear panel 130 located below the display module 110, and may be disposed to face a certain area of the display module 110 through a sensor placement area 131 (e.g., a hole) formed in the rear panel 130. For example, the fingerprint sensor module 120 may be disposed inside or below the sensor placement area 131 formed on the rear panel 130. Based on this, the fingerprint sensor module 120 may perform fingerprint sensing on a finger touched through a certain area of the display module 110. According to an embodiment, the fingerprint sensor module 120 may be disposed on the rear surface of the display module 110 in which at least some areas are transparently formed through the sensor placement area 131 to collect the light introduced through the display module 110. For example, the fingerprint sensor module 120 may receive the light emitted from at least one pixel (or at least one pixel disposed in the fingerprint authentication area) included in the display module 110 and reflected by an object located in the fingerprint authentication area through the sensor placement area 131. The fingerprint authentication area may include, for example, an area in which the fingerprint sensor module 120 is disposed among the area of the display module 110. Alternatively, the fingerprint authentication area may have a size of at least the display module 110 area facing the fingerprint sensor module 120 and include a certain sized area (e.g., an area which is set to a specific size larger than an area corresponding to the size of the fingerprint sensor module 120) in which a user's finger is touched based on an area facing the fingerprint sensor module 120. Hereinafter, an example in which the sensor placement area 131 is a hole will be described According to an embodiment, the fingerprint sensor module 120 may include an optical layer 121 and a fingerprint sensor 122. The optical layer 121 may include, for example, a pinhole array and a collimator. The optical layer 121 may reduce an angle of view of light using the pinhole array or collimator to condense the light passing through the optical layer in a first direction. The first direction may be, for example, a direction toward an upper surface of the fingerprint sensor 122. The fingerprint sensor 122 may be disposed under the optical layer 121 to generate image information using the light passing through the optical layer 121. The fingerprint sensor 122 may include, for example, a CMOS image sensor.

According to various embodiments, the fingerprint sensor module 120 may include a light emitting unit capable of irradiating a light to be used as a light source for fingerprint authentication and a light receiving unit capable of collecting the reflected light from which the irradiated light is reflected by a user's body (e.g., a finger). When the light of the display module 110 is collected, the fingerprint sensor module 120 may generate image information corresponding to the collected light and store the generated image information to be used by the a processor disposed on the printed circuit board 220. According to various embodiments, the fingerprint sensor module 120 may transmit an event for obtaining image information (e.g., information indicating whether image information is acquired) to the DDI included in the display module 110. In this regard, the electronic device 100 may further include a signal line capable of transmitting the event between the fingerprint sensor module 120 and the DDI.

The rear panel 130 may be disposed at the rear surface of the display module 110 to protect the display module 110 from impact, support the display module 110 on a housing (e.g., the bracket), or shield electromagnetic waves generated from the display module 110 or dissipate heat. For example, the rear panel 130 may include a protective layer (interchangeably, a supporting layer) (e.g., an embossing layer or cushion layer) on which an emboss pattern is formed or a heat dissipation layer at least partially formed of a metal material. The protective layer may be formed of, for example, a cushion or sponge for absorbing shock, or a light blocking member (e.g., a black sheet or black printed layer) for blocking light, and these components may be integrated and integrally formed or a plurality of layers formed for each component may be stacked. According to various embodiments, the rear panel 130 may include an electromagnetic induction panel (or a digitizer). The electromagnetic induction panel may detect approach of electromagnetic derivatives such as a stylus pen. The electromagnetic induction panel may be disposed between the protective layer and the heat dissipation layer. The rear panel 130 according to an embodiment of the disclosure may include a hole-shaped sensor placement area 131 in which the fingerprint sensor module 120 is inserted or vertically aligned with at least a portion of the fingerprint sensor module 120. The sensor placement area 131 may include a hole provided to penetrate the front and rear surfaces of the rear panel 130 while having a specific size corresponding to the size of the fingerprint sensor module 120. For example, the hole passing through the front and rear surfaces of the rear panel 130 may be disposed to penetrate the front and rear surfaces (or up and down) of the protective layer, electromagnetic induction panel, and heat dissipation layer.

The bracket 150 may be disposed between the rear panel 130 and the printed circuit board 220. The bracket 150 may include a sensor seating area 151 on which the fingerprint sensor module 120 is seated and fixed. The sensor seating area 151 may have a specific size corresponding to the size of the fingerprint sensor module 120 and may be formed in a hole shape provided to penetrate the front and rear surfaces of the bracket 150 or a groove shape engraved to a certain depth. According to various embodiments, the bracket 150 may further include a wiring hole or a wiring groove in which a wire for electrical connection between the fingerprint sensor module 120 to be seated and the processor disposed on the printed circuit board 220 is disposed.

The printed circuit board 220 may be disposed below the bracket 150. The printed circuit board 220 may include at least one electronic device 100 hardware component (e.g., a camera module, microphone, speaker, or USB interface). According to an embodiment, the printed circuit board 220 may be arranged with a processor that performs processing related to the fingerprint recognition. In addition, the printed circuit board 220 may include a contact point electrically connected to the battery 230 and a wire transmitting power provided by the battery 230 to the fingerprint sensor module 120 and the display module 110. The processor disposed on the printed circuit board 220 may be connected to the display module 110. The processor may output a fingerprint authentication guide UI to the display module 110 in response to a fingerprint authentication request. The processor may control at least one of screen control of the display module 110 or at least one of brightness or color of the fingerprint authentication area to control the fingerprint authentication area to have a designated brightness or a designated color during a fingerprint authentication process.

The battery 230 may be disposed under the rear panel 130 and in a layer parallel to the printed circuit board 220. The battery 230 may supply power to the printed circuit board 220 electrically connected thereto and may supply power to designations (e.g., the display module 110, fingerprint sensor module 120, and the like) corresponding to processor control of the printed circuit board 220.

The rear cover 240 may be disposed to surround at least a portion of the printed circuit board 220 and the battery 230 while being disposed under the printed circuit board 220 and the battery 230. The rear cover 240 may be made of various materials (e.g., plastic or metal material, or glass material). The rear cover 240 may be fixed to the case or bracket 150 described above.

Figure 3A:
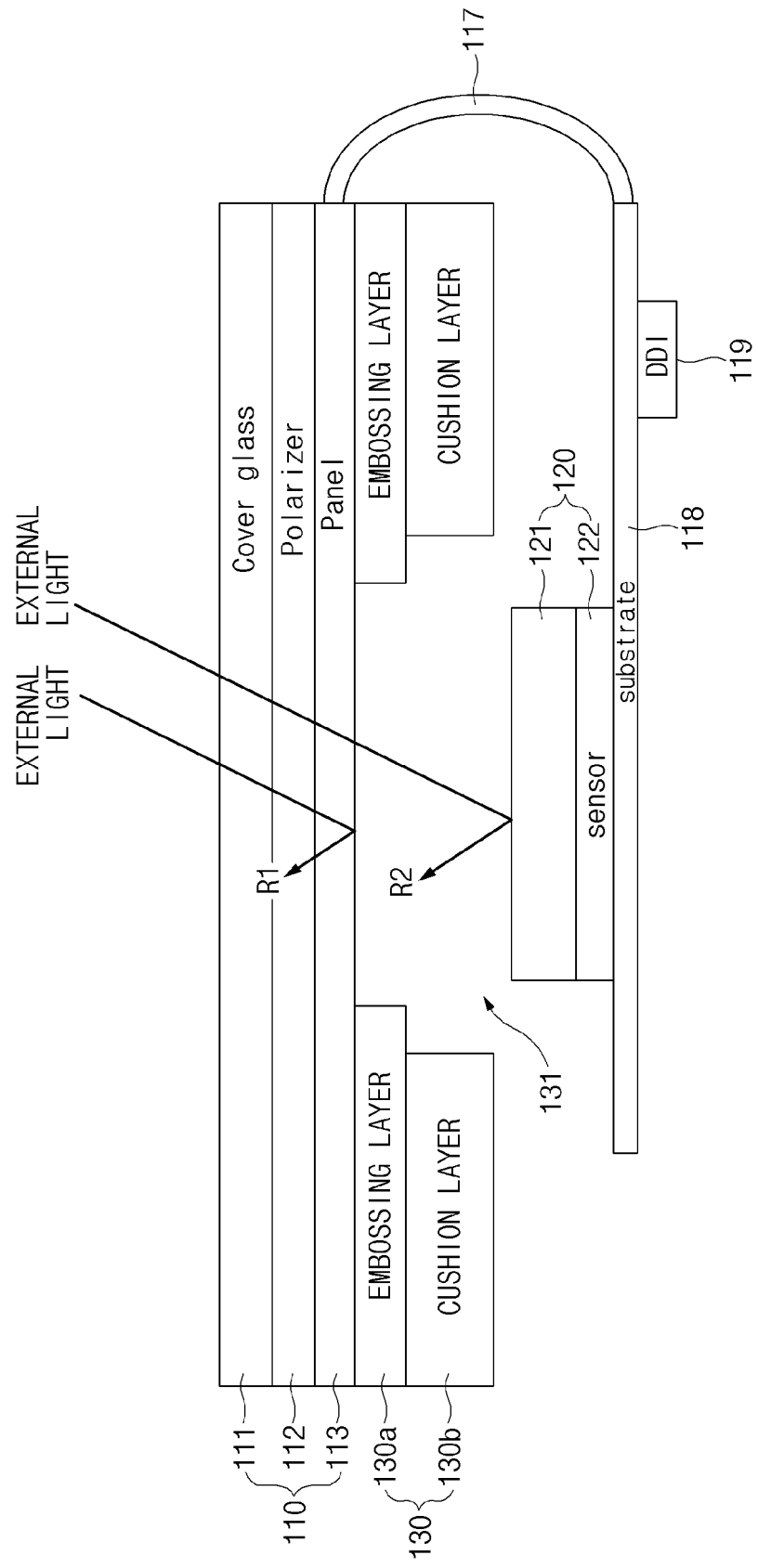
FIG. 3A is a view for explaining an arrangement structure of a display module 110 and a fingerprint sensor module 120, and reflection characteristics of an external light by a fingerprint sensor according to an embodiment.

FIG. 3A is a view for explaining an arrangement structure of the display module 110 and the fingerprint sensor module 120, and reflection characteristics of an external light by the fingerprint sensor according to an embodiment.

Referring to FIG. 3A, according to an embodiment, the display module 110 may include a transparent member (e.g., an external protective layer) 111 (e.g., a cover glass), a polarizing layer 112, and a display panel 113 (e.g., an OLED). The external protective layer 111 may be made of, for example, a transparent material such as a glass material or a polymer material. An adhesive layer may be disposed between the external protective layer 111 and the polarizing layer 112 to allow the adhesive layer to fix the external protective layer 111 to the polarizing layer 112.

A light (e.g., a natural light) flowing from the external protective layer 111 or a light (e.g., a pixel light) irradiated to the outside from the display panel 113 may vibrate in various directions and the polarizing layer 112 may transmit a light that vibrates only in a specific direction among the lights.

According to an embodiment, the display panel 113 may include at least one pixel. The display panel may include, for example, OLED-based pixels capable of self-emission. In an embodiment, the display panel 113 may output light related to a designated image in response to the control of the processor or the control of the DDI based on the power supplied from the battery 230.

The display panel 113 includes a plurality of pixels for outputting light and includes at least one transmission region (310 of FIG. 4) through which external light R1 and R2 is capable of being transmitted between the plurality of pixels.

At least one side of a flexible printed circuit board 117 or the display panel 113 may be connected to a substrate 118 on which a display driving module 119 and the fingerprint sensor 122 are mounted. The display panel 113 may further include a DDI (or display driving module) related to the control of the display panel 113, or may be connected to the DDI. For example, DDI may be mounted on a non-display area of the display panel 113 in a chip on glass (COP) type. The DDI disposed on the display panel 113 may be connected to the printed circuit board 220 through the flexible printed circuit board 117 and the substrate 118. The display driving module (e.g., the DDI) 119 may be disposed on at least one side of the flexible printed circuit board 117 as a chip on film (COF) type. As another example, the DDI mounted in the COF type on the flexible printed circuit board 117 may be integrally configured.

According to an embodiment, when the biometric sensor (e.g., fingerprint sensor module) 120 is disposed under the hole 131 formed in the rear panel 130 of the display module 110, an air gap may exist between the display module 110 and the fingerprint sensor module 120. Accordingly, the external light incident on the display module 110 may be reflected due to the air gap and the reflected light R1 may affect the display panel 113. Alternatively, the external light incident on the display module 110 may be reflected by the optical layer 121 of the fingerprint sensor module 120 and the reflected light R2 may affect visibility of the display panel 113. For example, in an off state of the display module 110, a color differences may occur between first pixels facing the hole 131 of the rear panel 130 and second pixels around the hole 131 among the pixels of the display module 110. For another example, the when there is strong light, current change generated in the driving circuit of the first pixels facing the hole 131 among the pixels of the display module 110 may occur and luminance difference may occur between the first pixels and the second pixels in the periphery of the hole 131 the first pixels due to the current change.

Figure 3B:
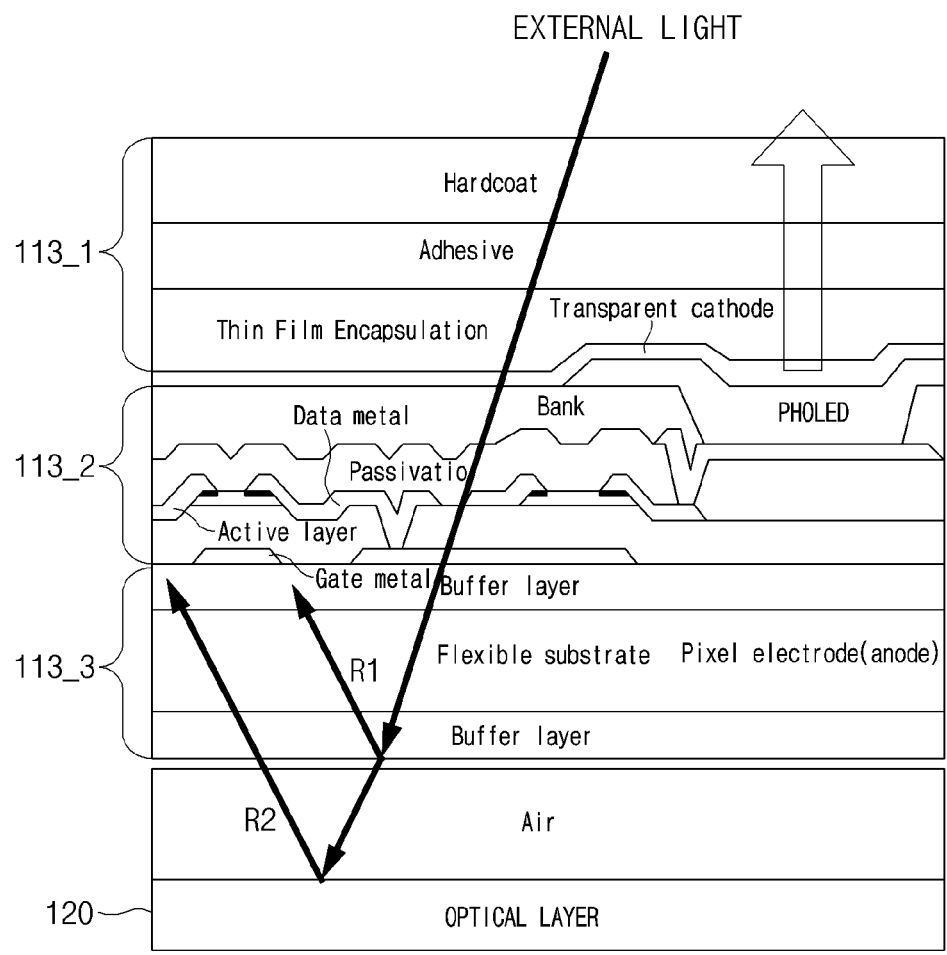
FIG. 3B illustrates a cross-sectional view of a display panel (e.g., OLED) according to an embodiment.

FIG. 3B illustrates a cross-sectional view of a display panel (e.g., OLED) according to an embodiment.

Referring to FIG. 3B, according to an embodiment, the display panel 113 may include a protective film 113_1, circuit components 113_2, and a substrate 113_3.

According to an embodiment, the protective film 113_1 may include films (e.g., hardcoat, thin film encapsulation, or the like) for protecting the circuit components 113_2. An adhesive layer for adhering between the protective films 113_1 may be included between the protective films 113_1.

According to an embodiment, the circuit components 113_2 may include a plurality of pixels for emitting light and a circuit (e.g., OLED, or TFT circuit) for controlling the pixels. The circuit components 113_2 may output a light related to a designated image in response to control of the DDI. For example, the TFT circuit may output a current responding to the DDI control to the OLED to light the OLED with a specified brightness. The OLED may replace, for example, the light emitting unit of the fingerprint sensor module 120.

According to an embodiment, the substrate 113_3 may be a substrate of a transparent material. A pattern for connection between the circuit components 113_2 may be formed on the substrate 113_3. A buffer layer (e.g., an air gap) may be included in upper and lower surfaces of the substrate 113_3 (or at least one surface of the upper or lower surfaces).

Figure 4:
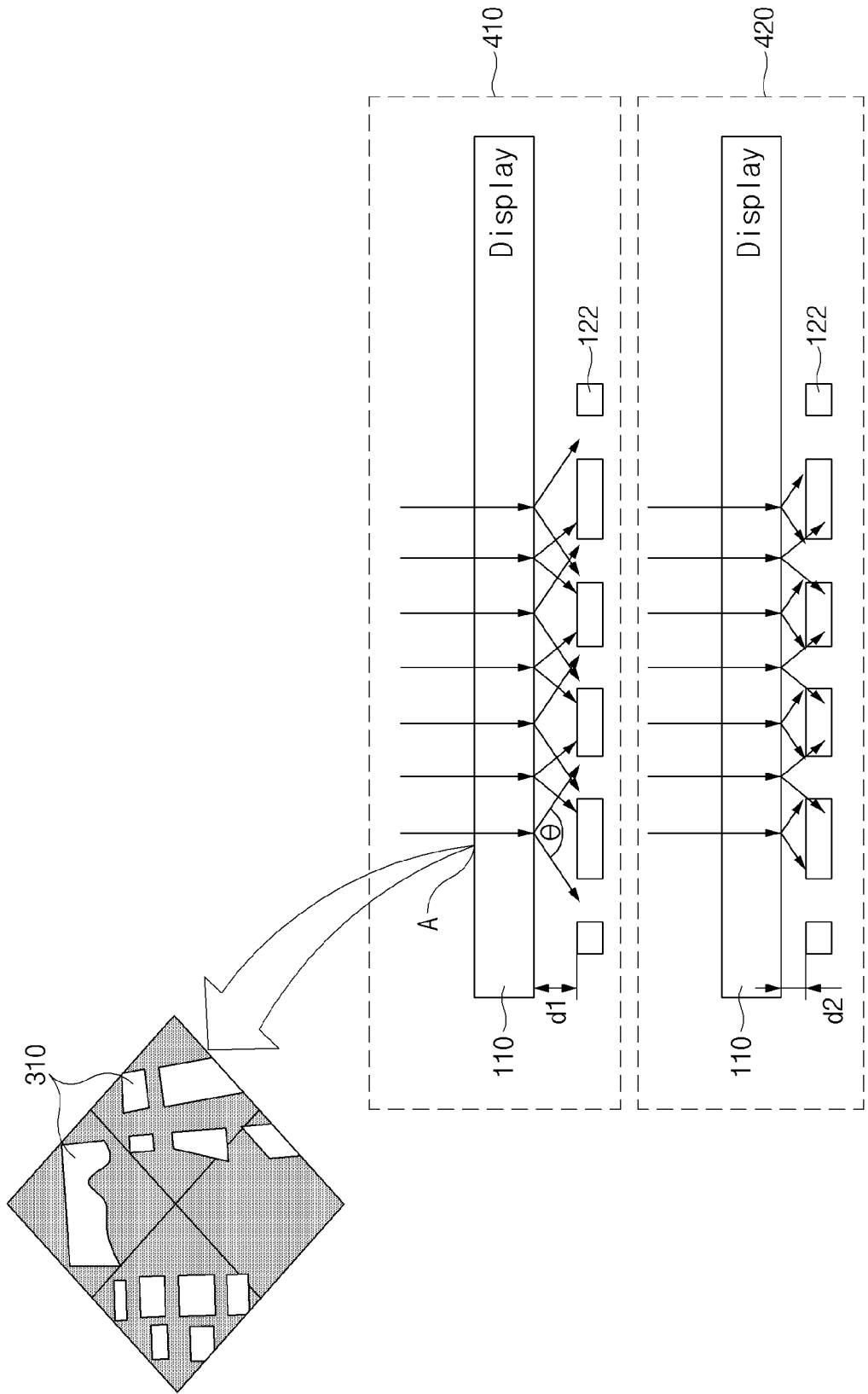
FIG. 4 is a view for explaining diffraction characteristics of a transmitted light transmitted through a display depending on a space between the display module 110 and an optical layer 121 according to an embodiment.

FIG. 4 is a view for explaining diffraction characteristics of a transmitted light transmitted through a display depending on a space between the display module 110 and the optical layer 121 according to an embodiment.

Referring to an enlarged view of region "A" of FIG. 4, the display module 110 (e.g., a display panel) may include a transmissive region 310. For example, when the display panel 113 is viewed from above, the transmissive region 310 may be a region on which the circuit components 113_2 does not mounted on the substrate (e.g., 113_3 in FIG. 3B) or a pattern of the substrate 113_3 does not formed. The transmissive region 310 may be not substantially a slit, but may have the identical or similar effect to a situation in which the external light passes through the slit. A diffraction angle of the external light may be increased as a width of the transmissive region 310 of the display module 110 is small.

An amount of diffraction of the external light may increase as a distance between the display module 110 and the optical layer 121 increases.

According to an embodiment, the distance between the display module 110 and the optical layer 121 may affect diffraction and reflection of the external light incident on the display module 110. For example, as the distance between the display module 110 and the optical layer 121 increases, the amount of light diffracted after passing through the transmissive region 310 of the display module 110 may increase. For another example, when the display module 110 and the optical layer 121 are spaced apart by a first distance d1 (410 in FIG. 4), the amount of light diffracted after passing through the transmissive region 31 of the display module 110 may be greater than when spaced apart by a second distance d2 (420 in FIG. 4) (d2<d1). Cross-talk may occur between diffracted lights and when the cross-talk is strong, the fingerprint sensor module 120 may not obtain a good signal necessary for fingerprint authentication. According to the above-described embodiment, when the distance between the display module 110 and the optical layer 121 decreases, the diffracted light due to the transmissive region 310 of the display module 110 may decrease.

According to an embodiment, the hole 131 in which the fingerprint sensor module (e.g., 120 of FIG. 2) is disposed among the display areas of the display module 110 may be visually different from the periphery. For example, in the off state of the display module 110, the color differences may occur between first pixels facing the hole 131 of the rear panel 130 and the second pixels of the periphery among the pixels of the display module 110. For another example, when a strong reflected light is incident, a leakage current may occur in a TFT that turns on the OLED, and thus a leakage current may occur in the driving circuit of the first pixels facing the hole 131 among the pixels of the display module 110 and the leakage current may cause a luminance difference between the first pixels and the second pixels in the periphery of the hole 131.

Figure 5A:
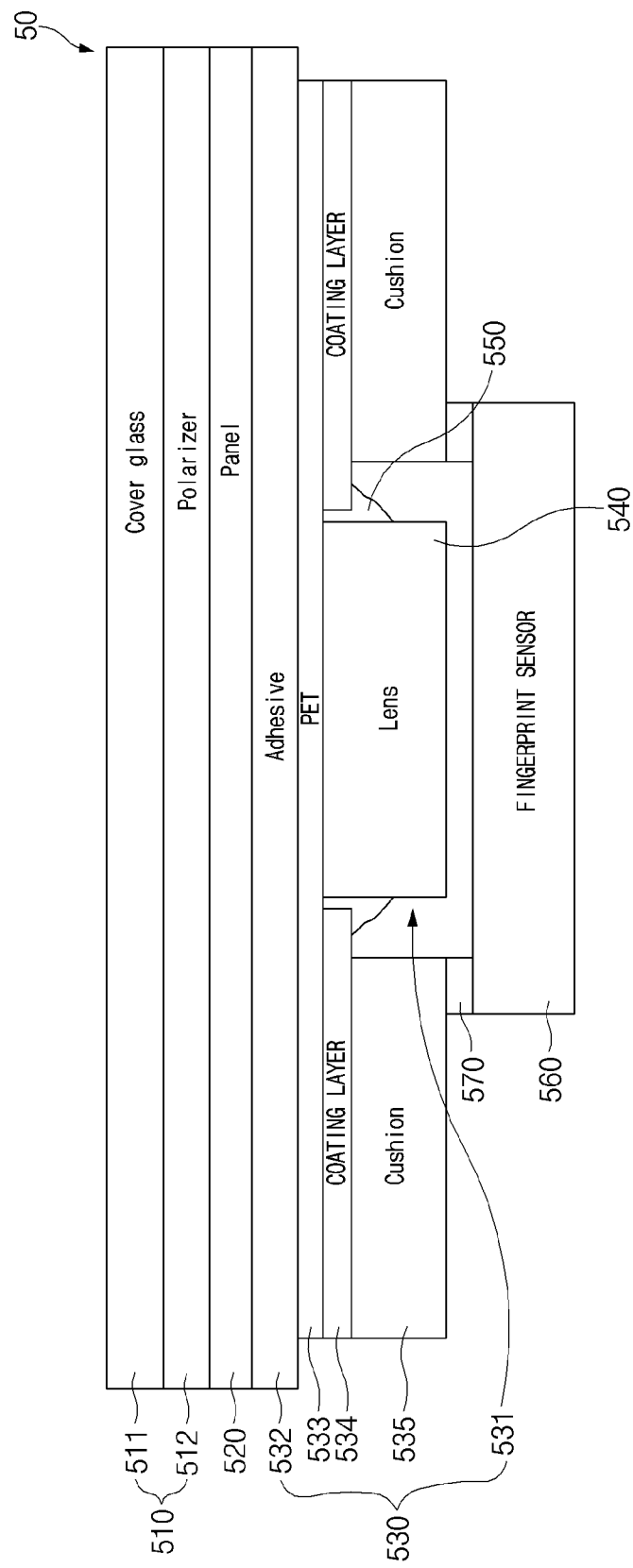
FIG. 5A illustrates a partial cross-sectional view of an electronic device including a light path changing member combined with a protective layer according to an embodiment.

FIG. 5A illustrates a partial cross-sectional view of an electronic device including a light path changing member combined with a protective layer according to an embodiment.

Referring to FIG. 5A, according to an embodiment, an electronic device 50 may include a transparent member 510, a display panel 520, a rear panel 530, a light path changing member 540, an adhesive member 550, and a biometric sensor 560 (e.g., an fingerprint sensor). In an embodiment, the electronic device 50 may omit some components or may further include additional components. In an embodiment, the electronic device 50 may be configured as one entity by combining some of the components, and perform functions of the corresponding components before combining. Herein, an example in the case where the biometric sensor is the fingerprint sensor 560 will be described.

According to an embodiment, the transparent member 510 may include an external protective layer 511 (e.g., a cover glass, etc.) and a polarizing layer 512. The external protective layer 511 may be made of, for example, a transparent material such as a glass material or a polymer material. An adhesive layer may be disposed between the external protective layer 511 and the polarizing layer 512 to fix the external protective layer 511 to the polarizing layer 512. A light (e.g., natural light) flowing from the external protective layer 511 or a light (e.g., pixel light) irradiated to the outside from the display panel 520 may vibrate in various directions, and the polarizing layer 512 may transmit the light which vibrates only in a specific direction among the lights.

According to an embodiment, the display panel may be disposed under the transparent member 510 and may include the display panel 520 including a plurality of pixels and at least one transmissive region (e.g., 310 of FIG. 3B) through which the light is capable of being transmitted between the plurality of pixels. The display panel may include, for example, OLED-based pixels capable of self-emission. The pixels disposed on the display panel 520 may emit light designated under control of a processor or a DDI. The light irradiated from the pixel may be reflected by an object (e.g., a finger) disposed in front surface of the display panel 520, pass through at least one transmissive region (e.g., 310 in FIG. 3B) of the display panel 520 and the light path changing member 540 to be transmitted to the light receiving unit of the fingerprint sensor 560.

According to an embodiment, the rear panel 530 is disposed on the rear surface of the display panel 520 to protect the display panel 520 from impact, support the display panel 520 on the housing (e.g., a bracket), or shield electromagnetic waves generated from the display panel 520 or dissipate heat.

The rear panel 530 may include, for example, a hole 531 and protective layers 532 to 535. The hole 531 may be formed in the rear panel 530 and may include an area in which the light path changing member 540 is disposed. The protective layers 532 to 535 may include the adhesive layer 532 (a first protective layer), the PET layer 533 (the first protective layer), the coating layer 534 (the first protective layer), and the cushion layer 535 (a second protective layer). The adhesive layer 532 may fix the rear panel 530 on which the hole 531 is formed to the display panel 520. The PET layer 533 may be a polyester film or an optical PET film. The coating layer 534 may be formed of a light blocking member (e.g., black sheet or black printed layer) for blocking light. The coating layer 534 may not be formed in a region facing the light path changing member 540 in the PET layer 533 not to block the light introduced into the light path changing member 540. The cushion layer 535 may be formed of, for example, a cushion or sponge for absorbing shock. An adhesive layer may be further included between the coating layer 534 and the cushion layer 535 to fix the cushion layer 535 to the coating layer 534. Each of the components of the protective layers 532 to 535 may be integrated and integrally formed, or a plurality of layers formed for each component may be stacked. In FIG. 5A, a case where each component is formed by stacking a plurality of layers is illustrated as an example. One of the protective layers 532 to 535 may be included in the display panel 520. For example, the adhesive layer 532 may be included in the display panel 520. According to the above-described embodiment, the light blocking layer may be provided in the light path changing member 540, and thus the light path changing member 540 may not reflect the light incident from the outside not to block the light transmitted to the fingerprint sensor 560.

According to an embodiment, the light path changing member 540 may be disposed between the fingerprint sensor 560 and the display panel 520 to change a light path of at least a part of the transmitted light passing through the transmissive region (e.g., 310 of FIG. 3B). The transmitted light may be, for example, light emitted from at least one pixel of the display panel 520 and transmitted through the transmissive region after being reflected by an external object (e.g., a finger). The external object may include, for example, a finger positioned above the fingerprint sensor 560 outside the transparent member 510. For example, the light path changing member 540 may be disposed between the fingerprint sensor 560 and the display panel 520 to be separated from the display panel 520 by a first distance and to be spaced apart from the fingerprint sensor 560 by a second distance (>first distance). For example, the first distance may be set such that interference by diffraction of the transmitted light is equal to or less than a specified size. The specified size may be experimentally determined, for example, based on an effect of diffraction interference on a fingerprint recognition signal of the fingerprint sensor 560. For another example, the light path changing member 540 may be disposed inside the hole 531 (e.g., a hole) formed in a rear cover 240. According to the above-described embodiment, as the light path changing member 540 is disposed close to the display panel 520, a problem in that the fingerprint sensor 560 does not obtain a good signal necessary for fingerprint recognition due to diffraction of the light in the transmissive region of the display panel 520 may be prevented.

According to an embodiment, the light path changing member 540 may be formed to change a path of at least some of the light transmitted through the transmissive region 310. The light path changing member 540 may include an optical layer, for example, a lens, a pinhole array, or a multi-layer collimator and may collect a light incident on the optical layer. The light path changing member 540 may further include at least one of a light blocking layer, a filter layer, or a buffer layer. For example, the light blocking layer may block light from entering or reflecting to a path other than the path formed in the optical layer. For example, the light blocking layer may include a black coating layer (e.g., a black sheet or black printed layer) that is attached or applied to an area other than the light incident area on an upper surface of the optical layer. The filter layer may block incidence of light other than a designated wavelength band (e.g., red and near infrared band light). The buffer layer may be attached to the upper surface (e.g., a surface facing the display) of the optical layer to adjust the distance between the display panel 520 and the fingerprint sensor 560.

According to an embodiment, the adhesive member 550 may be applied in a liquid form (e.g., a curing liquid) to fill an area where the light path changing member 540 is not disposed in the hole 531 formed in the rear panel 530 and then be cured to fix the light path changing member 540 to the first protective layers 532, 533, and 534 (e.g., the PET layer 533) of the rear panel 530. The adhesive member 550 may have light blocking properties the same as or similar to those of the light blocking layer. (e.g., a black coating layer) of the light path changing member 540. For example, the adhesive member 550 may be configured to have a refractive index equal to a refractive index of the light blocking layer of the light path changing member 540 or to have a refractive index less than a critical difference.

According to an embodiment, the light path changing member 540 may be formed of a material or a structure that affects the display panel 520 less. For example, the light path changing member 540 may be made of a metal material having flexibility. For another example, the light path changing member 540 may be rounded on an outer surface in contact with the display panel 520. According to the above-described embodiment, the light path changing member 540 may prevent a problem of damaging the display panel 520 due to frictional force between the light path changing member 540 and the display panel 520 or external impact.

According to an embodiment, the fingerprint sensor 560 may obtain the transmitted light, which is output through at least some of the plurality of pixels of the display panel 520, is reflected by an external object close to the transparent member 510, and passes through the transmissive region of the display panel 520, passing through the light path changing member 540. For example, the fingerprint sensor 560 may obtain the light, which is transmitted through at least some of the plurality of pixels of the display panel 520, is reflected by the external object close to the transparent member 510, and then passes through the transmissive region of the display panel 520 to change the light path changing member 540, incident on the light receiving unit of the fingerprint sensor 560. The fingerprint sensor 560 may configure the image information necessary for the fingerprint recognition using the obtained light and may store the configured image information in an internal memory (not illustrated) of the fingerprint sensor 560 or in the memory 1530 of the electronic device 50 to allow a processor (e.g., AP, DDI, low power processor, etc.) of the electronic device 50 to access the configured image information.

According to an embodiment, the fingerprint sensor 560 may be fixed to a protective layer different from the light path changing member 540. For example, the light path changing member 540 may be fixed to the first protective layers 532, 533, and 534 using a first adhesive member (e.g., a curing solution) and the fingerprint sensor 560 may be may be to the cushion layer 535 (the second protective layer) using a second adhesive member (e.g., adhesive).

Figure 5B:
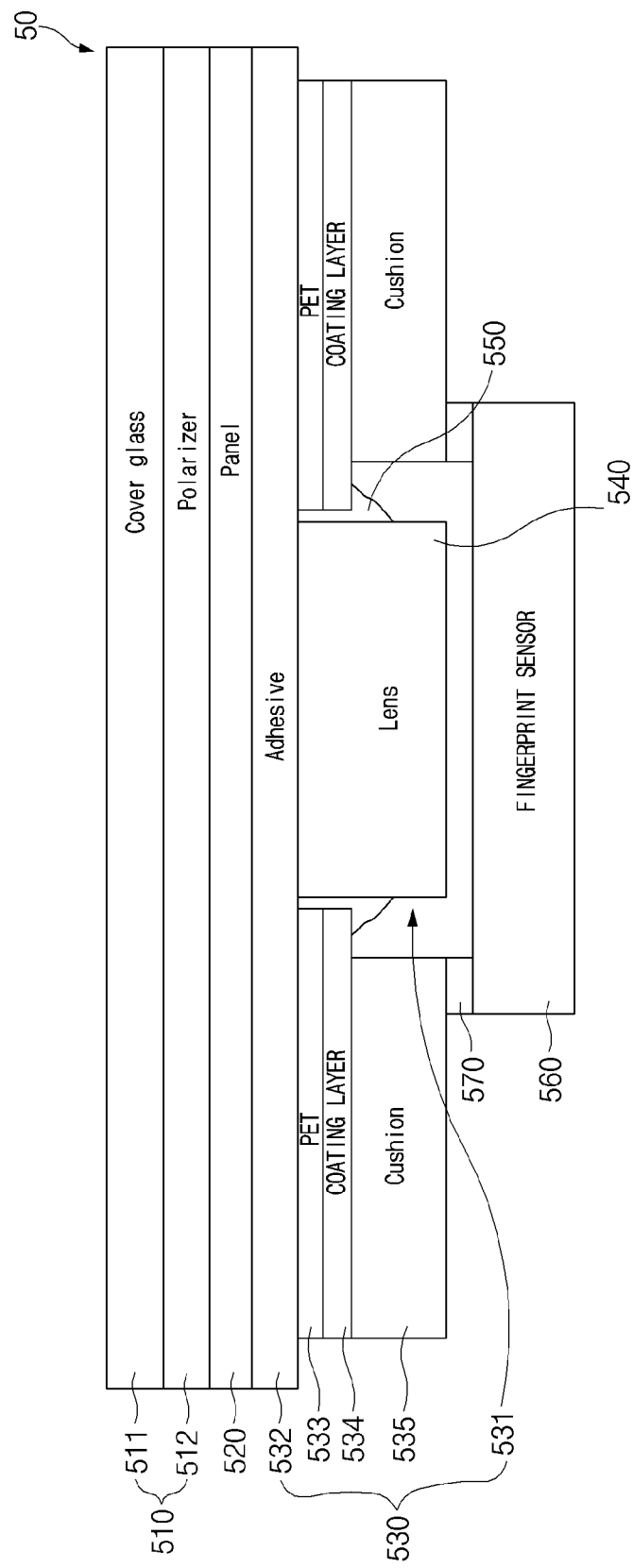
FIG. 5B illustrates a partial cross-sectional view of an electronic device including a light path changing member combined with another protective layer according to an embodiment.

FIG. 5B illustrates a partial cross-sectional view of an electronic device including a light path changing member combined with another protective layer according to an embodiment.

Referring to FIG. 5B, according to an embodiment, the electronic device 50 may include the transparent member 510, the display panel 520, the rear panel 530, the light path changing member 540, the adhesive member 550, and the fingerprint sensor 560. The embodiment of FIG. 5B differs from the embodiment of FIG. 5A in a structure of the protective layers 532 to 535 and a combining structure between the protective layers 532 to 535 and the light path changing member 540 and the difference will be mainly described.

According to an embodiment, the protective layers 532 to 535 may be different from the protective layers 532 to 535 in the shape or arrangement of the PET layer 533. For example, unlike FIG. 5A, the PET layer 533 may not be formed in the hole 531 of the rear panel 530. For another example, the PET layer 533 may be not formed in the hole 531 or a region facing the light path changing member 540, but may be formed in other regions of the display panel 520. Accordingly, the light path changing member 540 may be attached to the adhesive layer 532 of the rear panel 530 to be fixed to the display panel 520.

According to an embodiment, a curing liquid to fill an area where the light path changing member 540 is not disposed in the hole 531 formed in the rear panel 530 may be applied and cured to form the adhesive member 550, and therefore the light path changing member 540 may be fixed to the rear panel 530 to be in contact with the adhesive layer 532 of the rear panel 530.

Figure 5C:
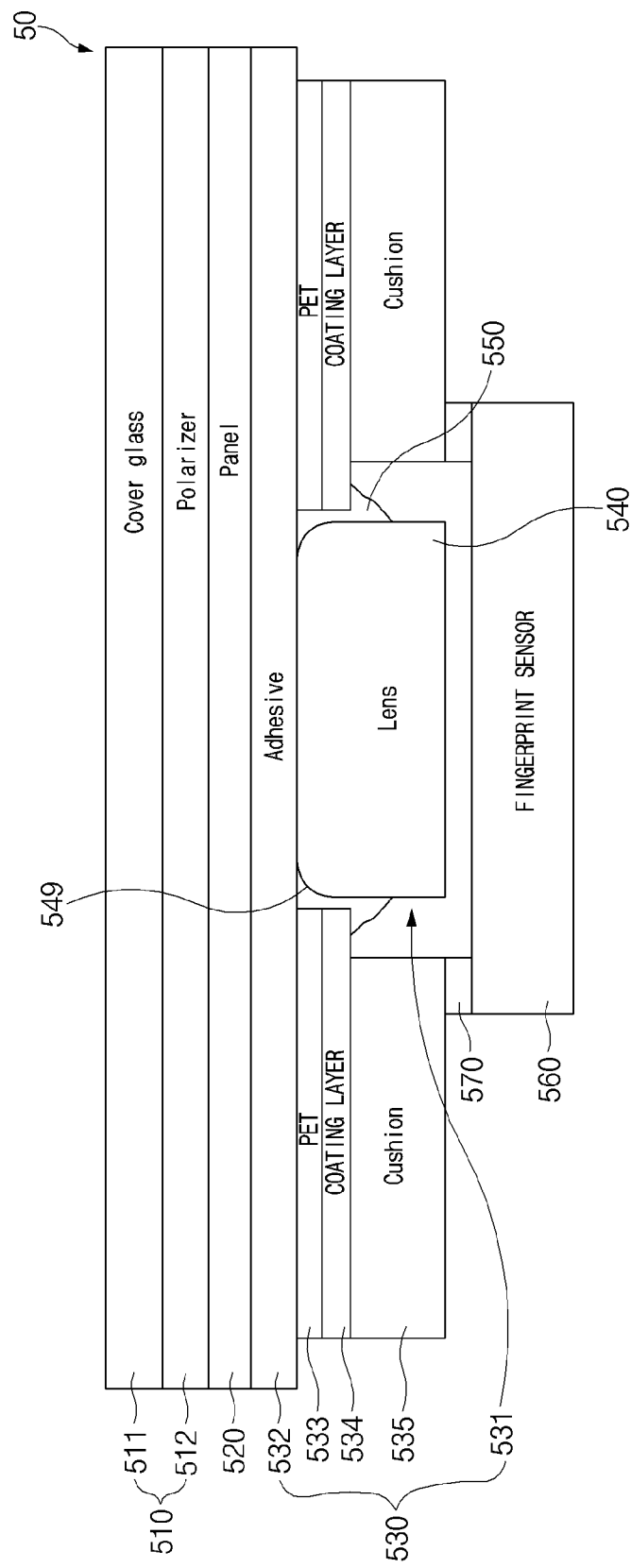
FIG. 5C illustrates a partial cross-sectional view of an electronic device including a rounded light path changing member according to an embodiment.

FIG. 5C illustrates a partial cross-sectional view of an electronic device including a rounded light path changing member according to an embodiment.

Referring to FIG. 5C, according to an embodiment, the light path changing member 540 may have a rounded circumference or outer 549 in contact with the display panel 520. Additionally or alternatively, the light path changing member 540 may be made of a metal material having a flexibility greater than or equal to a specified flexibility. According to the above-described embodiment, the light path changing member 540 may prevent a problem of damaging the display panel 520 due to friction between the light path changing member 540 and the display panel 520 or impact.

As above-described in FIGS. 5A to 5C, an example of a case where the light path changing member 540 is disposed inside the hole 531 and the fingerprint sensor 560 is disposed below the hole 531 is explained. However, according to an embodiment, at least a portion of the fingerprint sensor 560 may be disposed inside the hole 531. This will be described later.

Figure 6A:
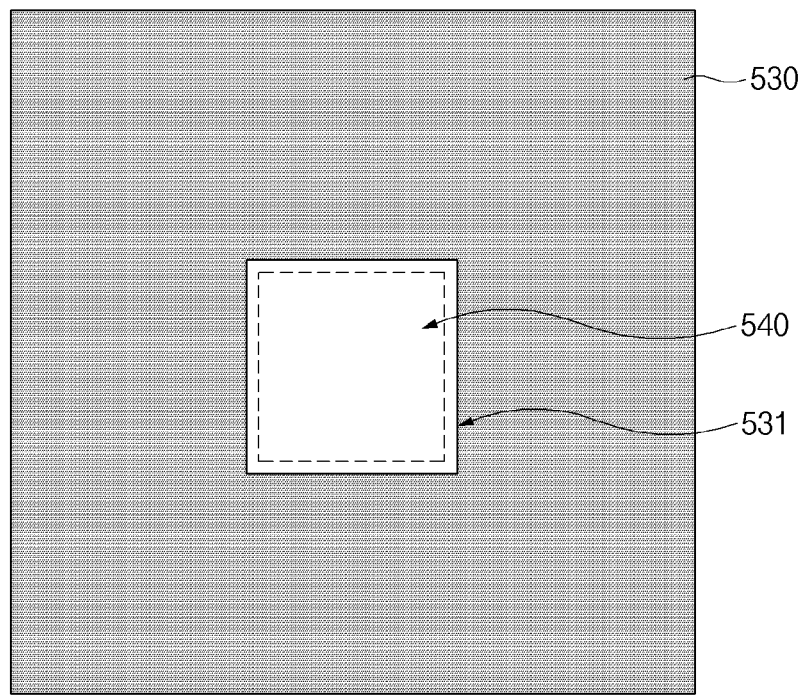
FIG. 6A is a view of a hole 531 having an identical or similar shape to a light path changing member 540 according to an embodiment, as viewed from above.

FIG. 6A is a view of the hole 531 having an identical or similar shape to the light path changing member 540 according to an embodiment, as viewed from above.

Referring to FIG. 6A, according to an embodiment, the hole 531 may be formed in the rear panel 530 with a size that exceeds at least a size of the light path changing member 540. For example, when the light path changing member 540 is a first size of a square shape (refer to a dotted area), the hole 531 may be formed to have a second size (>the first size) of a square shape in the rear panel 530. For another example, the size of the hole 531 may be determined such that the curing liquid may be injected through a gap between the side surface of the light path changing member 540 disposed in the hole 531 and the rear panel 530. The curing solution may be, for example, the adhesive member 550 that is cured to fix the light path changing member 540 to the rear panel 530.

Figure 6B:
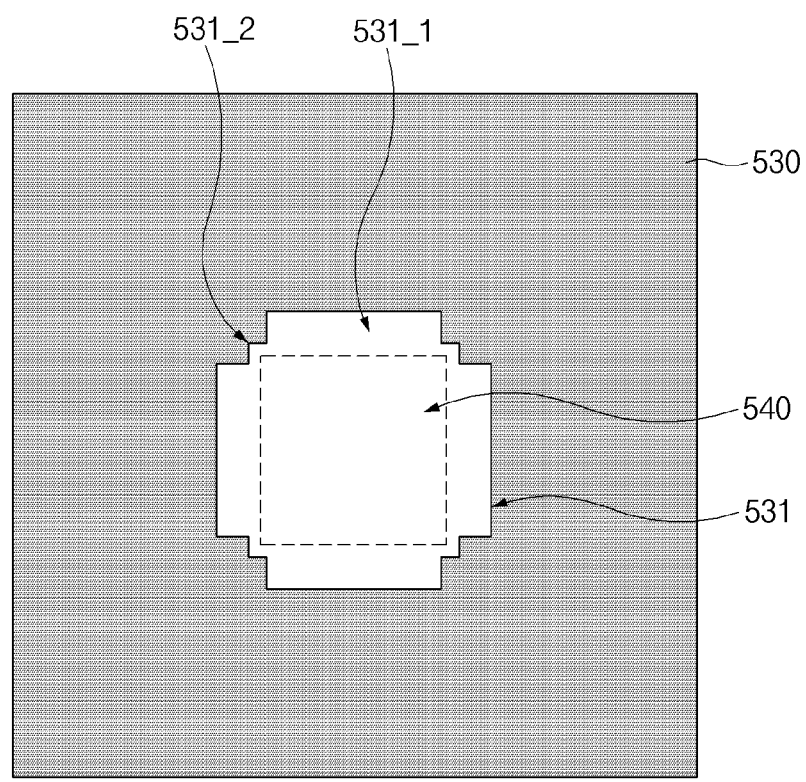
FIG. 6B is a view of the hole 531 having a different shape from the light path changing member 540 according to an embodiment, as viewed from above.

FIG. 6B is a view of the hole 531 having a different shape from the light path changing member 540 according to an embodiment, as viewed from above.

Referring to FIG. 6B, according to an embodiment, the hole 531 may include at least one of a guide unit 531_2 and an injection unit 531_1.

According to an embodiment, the guide unit 531_2 may be formed to guide the light path changing member 540 to be disposed in the hole 531. For example, when the light path changing member 540 is a first size of a square shape (refer to a dotted square), the guide unit 531_2 may be formed to correspond to corners of a square of a second size larger than the first size, as illustrated in FIG. 6B. Unlike FIG. 6B, when the light path changing member 540 has a first size of a square shape, the guide unit 531_2 may have a circular shape having a designated diameter, whose center point coincides with a center point of the rectangle with the first size. The specified diameter may be determined, for example, to exceed a diagonal length of the first sized square.

According to an embodiment, each side surface of the light path changing member 540 may extend toward the outside of each side surface in a specific shape to form the injection unit 531_1. For example, as illustrated in FIG. 6B, each side surface of the light path changing member 540 may extend toward the outside of each side surface in a square shape to form the injection unit 531_1. Unlike FIG. 6B, the specific shape may include, for example, at least one of a circular shape cut by more than half or a triangular shape. Hereinafter, the light path changing member including a pinhole array or a multi-layer collimator according to various embodiments will be described with reference to FIGS. 7A to 11B.

Figure 7A:
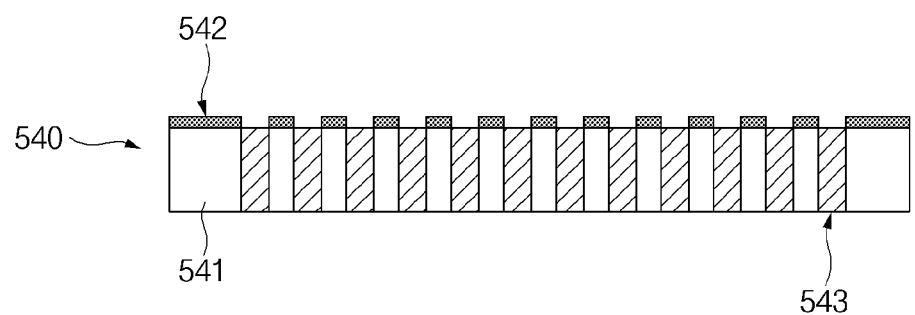
FIG. 7A illustrates a cross-sectional view of a light path changing member including a pinhole array according to an embodiment.

FIG. 7A illustrates a cross-sectional view of a light path changing member including a pinhole array according to an embodiment.

Referring to FIG. 7A, according to an embodiment, the light path changing member 540 may include a first frame member 541, a light blocking layer 542, and a pinhole array 543.

According to an embodiment, the first frame member 541 may be a member on which the pinhole array 543 of the light path changing member 540 is formed. For example, the first frame member 541 may be made of a metal material having a flexibility greater than a specified flexibility.

According to an embodiment, the light blocking layer 542 may be formed (e.g., coated) in an area other than at least one hole of the pinhole array 543 and block light from being incident or reflected. For example, the light blocking layer 542 may include a black coating layer (e.g., a black sheet or black printing layer) that is attached or applied to an upper surface of a region where each pinhole (e.g., 531) of the pinhole array is not formed. In an embodiment, the light blocking layer 542 may be formed to have a refractive index corresponding to the coating layer 534 of the rear panel 530. According to the above-described embodiment, the light blocking layer 542 may reduce occurrence of the cross talk which occurs when the light passing through the transmissive region (e.g., 310 of FIG. 3B) of the display panel 520 is reflected or diffracted again from the upper surface of the light path changing member 540.

According to an embodiment, the pinhole array 543 may allow the light transmitted through the transmissive region 310 of the display panel 520 to be condensed in a direction toward the fingerprint sensor 560 (e.g., a direction perpendicular to the upper surface of the fingerprint sensor 560). For example, the pinhole array 543 may be formed on the light path changing member 540 in the same size and shape.

Figure 7B:
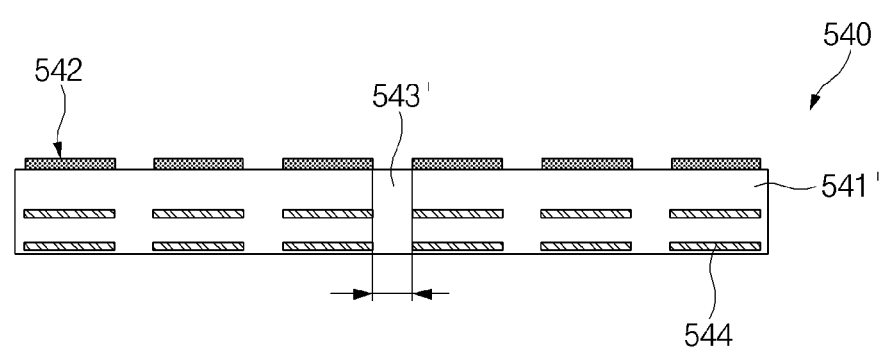
FIG. 7B illustrates a cross-sectional view of a light path changing member including a multi-layer collimator according to an embodiment.

FIG. 7B illustrates a cross-sectional view of a light path changing member including a multi-layer collimator according to an embodiment.

Referring to FIG. 7B, according to an embodiment, the light path changing member 540 may include a second frame member 541', the light blocking layer 542, and a multi-layer collimator 543'. FIG. 7B may replace the pinhole array 543 of FIG. 7A with the multi-layer collimator 543'. According to an embodiment, the configuration of the light blocking layer 542 is the same as or similar to the above-described configuration, and thus detailed description of the light blocking layer 542 will be omitted in the following.

According to an embodiment, the second frame member 541' may be made of a transparent material and may be a member formed in a specified shape (e.g., a square shape). A plurality of masking patterns 544 may be formed inside the second frame member 541' and an area in which the masking patterns 544 are not formed may be the multi-layer collimator 543' corresponding to the pinhole array 543.

According to an embodiment, the masking pattern 544 may be disposed in a multi-layer structure on a designated member (e.g., a soft metal member) to form the multi-layer collimator 543'. The multi-layer collimator 543' may function as the pinhole array 543.

Figure 8A:
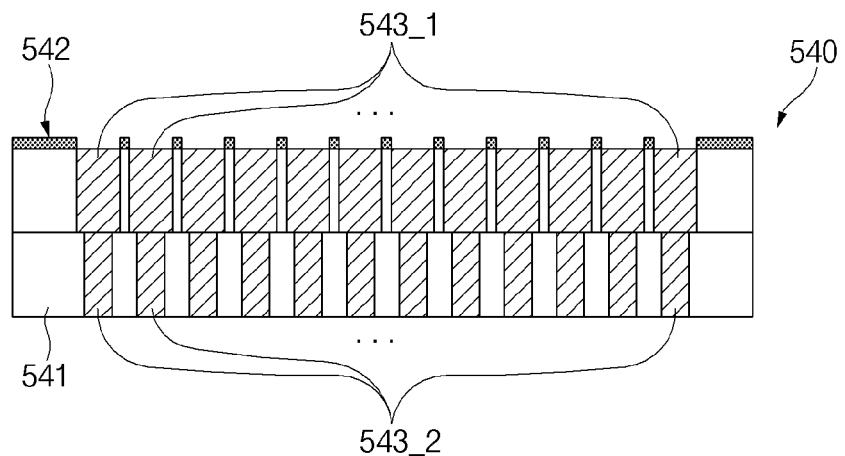
FIG. 8A is a cross-sectional view of a light path changing member including a plurality of pinhole arrays according to an embodiment.

FIG. 8A is a cross-sectional view of a light path changing member including a plurality of pinhole arrays according to an embodiment.

Referring to FIG. 8A, according to an embodiment, the light path changing member 540 may include the light blocking layer 542, a first pinhole array 543_1, and a second pinhole array 543_2.

According to an embodiment, the first pinhole array 543_1 may include a hole of a specific shape having a first width or a circular hole having a first diameter. A first surface (e.g., an upper surface) of the first pinhole array 543_1 may be in contact with the rear surface of the display panel 520 and a second surface (e.g., a lower surface) of the first pinhole array 543_1 may be in contact with the second pinhole array 543_2. The first pinhole array 543_1 may condense a light (e.g., a light which is reflected by an external object and then passes through the transmissive region 310 after being output from the display panel 520) passing through the transmissive region 310 of the display panel 520.

According to an embodiment, the second pinhole array 543_2 may include a hole of a specific shape having a second width (<first width) or a circular hole having a second diameter (<first diameter). A first surface (e.g., an upper surface) of the second pinhole array 543_2 may be in contact with the first surface of the first pinhole array 543_1 and a second surface (e.g., a lower surface) of the second pinhole array 543_2 may be in contact with the fingerprint sensor 560. The second pinhole array 543_2 may further condense the light collected by the first pinhole array 543_1.

According to the above-described embodiment, the plurality of pinhole arrays 543 having different angles of view (or widths) may be used to further collect the light passing through the transmissive region 310 of the display panel 520, and thus light converging effect of the light path changing member 540 may be enhanced.

Figure 8B:
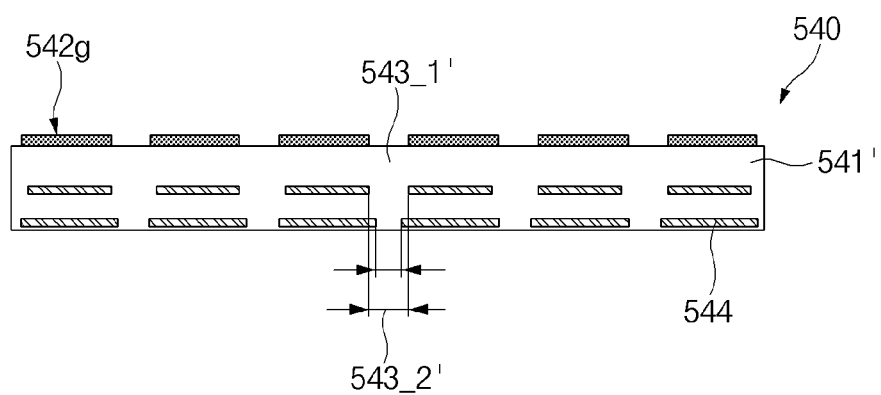
FIG. 8B is a cross-sectional view of a light path changing member including a multi-layer collimator having different widths according to an embodiment.

FIG. 8B is a cross-sectional view of a light path changing member including a multi-layer collimator having different widths according to an embodiment.

Referring to FIG. 8B, according to an embodiment, the light path changing member 540 includes the second frame member 541', the light blocking layer 542, a first layer collimator 543_1', and a second layer collimator 543_2'. FIG. 8B may replace the first pinhole array 543_1 of FIG. 8A with the first layer collimator 543_1' and the second pinhole array 543_2 with the second layer collimator 543_2'. According to an embodiment illustrated in FIG. 8B, the multi-layer collimator 543' having different angles of view (or widths) may be used to further collect the light passing through the transmissive region (310 of FIG. 3B) of the display panel 520, and thus the light converging effect of the light path changing member 540 may be enhanced.

Figure 9A:
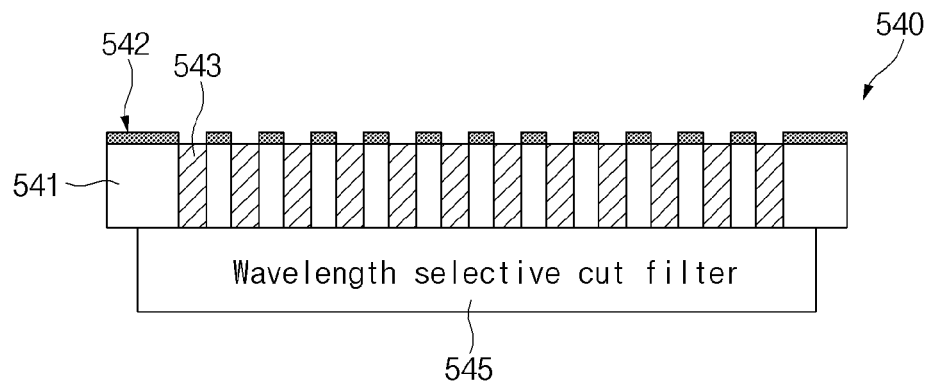
FIG. 9A illustrates a cross-sectional view of a light path changing member including a filter layer and a pinhole array according to an embodiment.

FIG. 9A illustrates a cross-sectional view of a light path changing member including a filter layer and a pinhole array according to an embodiment.

Referring to 9A, according to an embodiment, the light path changing member 540 may include the first frame member 541, the light blocking layer 542, the pinhole array 543, and a filter layer 545. The embodiment of FIG. 9A is different from FIG. 7A in that the filter layer 545 is further included. Therefore, the difference will be mainly described in FIG. 9A.

According to an embodiment, a first surface (e.g., an upper surface) of the first frame member 541 may be combined (e.g., applied or attached) to the light blocking layer 542 and a second surface (e.g., a lower surface) of the first frame member 541 may be combined with the filter layer 545.

According to an embodiment, the filter layer 545 may be combined with the second surface (e.g., a lower surface) of the first frame member 541. For example, the filter layer 545 may be fixed to the second surface of the first frame member 541 using an adhesive material (e.g., adhesive).

In an embodiment, the filter layer 545 may pass light below a designated wavelength band. For example, the filter layer 545 may block light having red and near infrared wavelengths (e.g., light having a wavelength of 600 nm or more, sunlight, or the like). Because the light passing through the filter layer 545 is transmitted to the fingerprint sensor 560, the fingerprint sensor 560 may not acquire the light having red or near infrared wavelength.

According to the above-described embodiment, the light path changing member 540 may include the filter layer 545 and the filter layer 545 may block the light except for transmitted light of the display panel 520, for example, sunlight from introducing to the fingerprint sensor 560, thereby preventing a problem that causes an error in the fingerprint recognition of the fingerprint sensor 560 due to sunlight.

Figure 9B:
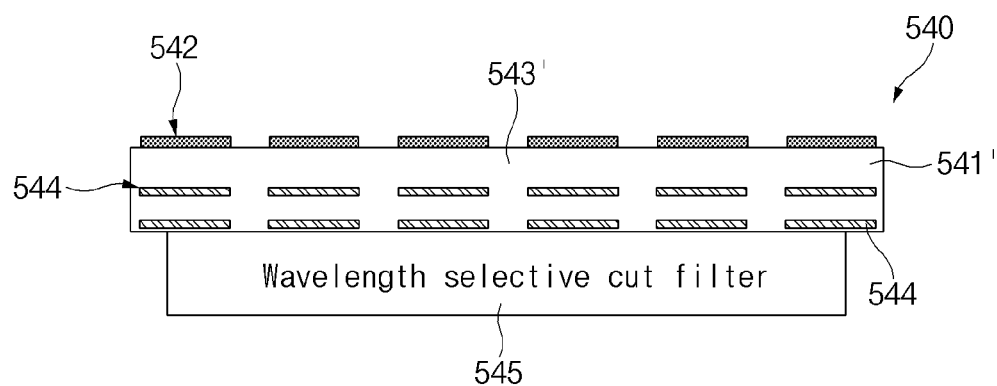
FIG. 9B is a cross-sectional view of a light path changing member including a filter layer and a multi-layer collimator according to an embodiment.

FIG. 9B is a cross-sectional view of a light path changing member including a filter layer and a multi-layer collimator according to an embodiment.

Referring to 9A, the light path changing member 540 may include the second frame member 541', the light blocking layer 542, the multi-layer collimator 543', and the filter layer 545. FIG. 9B differs from FIG. 9A in that the pinhole array 543 of FIG. 8A is replaced with the multi-layer collimator 543', and detailed description thereof is omitted.

Figure 10A:
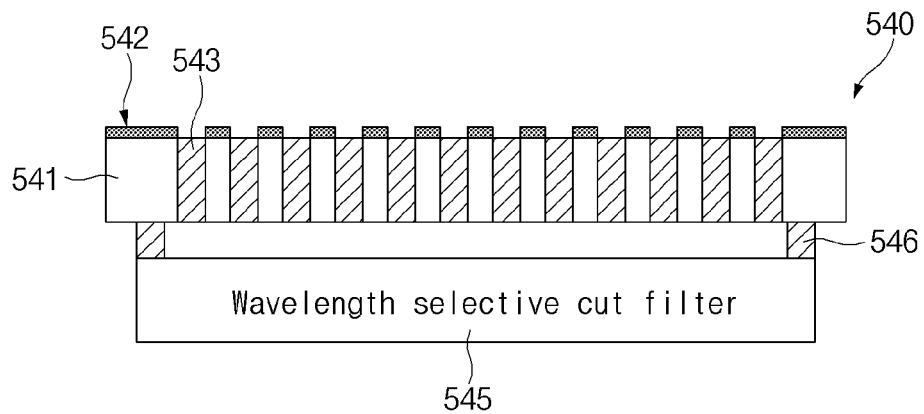
FIG. 10A is a sectional view of a light path changing member including a filter layer, a pinhole array, and a spacer according to an embodiment.

FIG. 10A is a sectional view of a light path changing member including a filter layer, a pinhole array, and a spacer according to an embodiment.

Referring to FIG. 10A, according to an embodiment, the light path changing member 540 may include the first frame member 541, the light blocking layer 542, the pinhole array 543, the filter layer 545, and a spacer 546. The embodiment of FIG. 10A is different from FIG. 9A in that the spacer 546 is further included, and the difference will be mainly described in FIG. 10A.

According to an embodiment, the spacer 546 may be disposed between the second surface (e.g., the lower surface) of the first frame member 541 and the first surface (e.g., the upper surface) of the filter layer 545 to allow the filter layer 545 to be combined with the first frame member 541 with a space (e.g., an air gap) interposed therebetween. An adhesive layer may be further included between the first frame member 541 and the spacer 546 and between the spacer 546 and the filter layer 545 to fix the first frame member 541 and the filter layer 545 with the spacer 546 interposed therebetween.

The spacer 546 may use a region in which each pinhole of the pinhole array 543 is not formed in the second surface of the first frame member 541 to fix the first frame member 541 and the filter layer 545. Therefore, it is possible to prevent a problem affecting properties of the pinholes due to the adhesive layer (or adhesive) that fixes the spacer 546, the first frame member 541, and the filter layer 545 to one another.

Figure 10B:
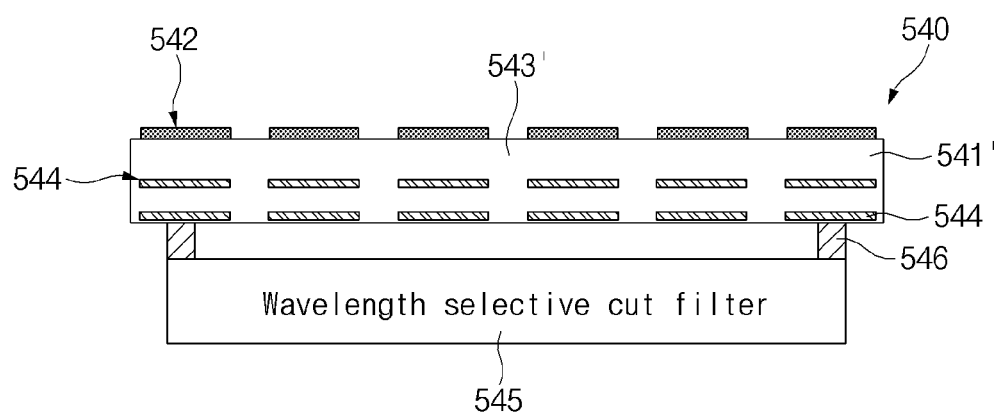
FIG. 10B is a cross-sectional view of a light path changing member including a filter layer, a multi-layer collimator, and a spacer according to an embodiment.

FIG. 10B is a cross-sectional view of a light path changing member including a filter layer, a multi-layer collimator, and a spacer according to an embodiment.

Referring to FIG. 10B, according to an embodiment, the light path changing member 540 may include the second frame member 541', the light blocking layer 542, the multi-layer collimator 543', the filter layer 545, and the spacer 546. The embodiment of FIG. 10B differs from FIG. 10A in that the pinhole array 543 is replaced with the multi-layer collimator 543', and detailed description thereof is omitted.

Figure 11A:
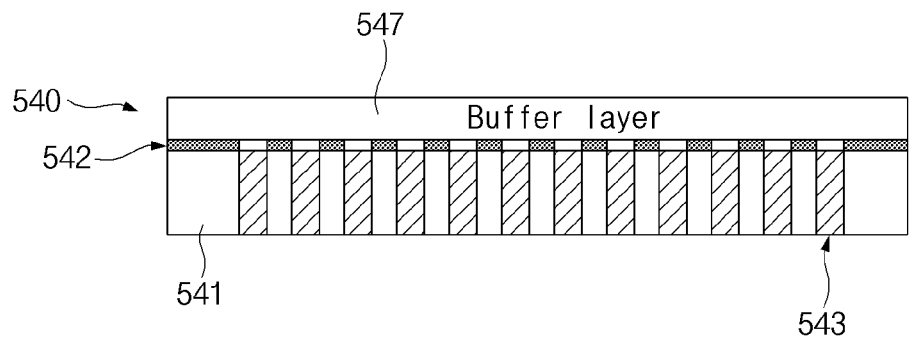
FIG. 11A is a cross-sectional view of a light path changing member including a buffer layer and a pinhole array according to an embodiment.

FIG. 11A is a cross-sectional view of a light path changing member including a buffer layer and a pinhole array according to an embodiment.

Referring to FIG. 11A, according to an embodiment, the light path changing member 540 may include the first frame member 541, the light blocking layer 542, the pinhole array 543, and a buffer layer 547. The embodiment of FIG. 11A differs from FIG. 7A in that the buffer layer 547 is further included, and therefore the difference will be mainly described in FIG. 11A.

According to an embodiment, the buffer layer 547 may include at least one of an air gap and PET layer. The buffer layer 547 may be attached to the first surface (e.g., the upper surface) of the first frame member 541, for example, using an adhesive layer to be disposed between the light path changing member 540 and the display panel 520. According to the above-described embodiment, pressure may be applied to the display panel 520 when the light path changing member 540 is attached to the display panel 520 and the buffer layer 547 may absorb a part of the pressure, thereby preventing the display panel 520 from being damaged. The buffer layer 547 may also be applied to the embodiments of FIGS. 8A, 9A, and 10A.

Figure 11B:
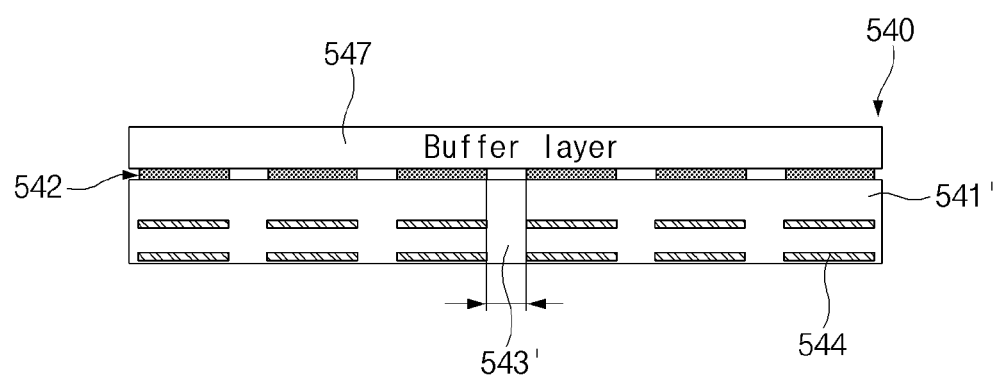
FIG. 11B illustrates a cross-sectional view of a light path changing member including a buffer layer and a multi-layer collimator according to an embodiment.

FIG. 11B illustrates a cross-sectional view of a light path changing member including a buffer layer and a multi-layer collimator according to an embodiment.

Referring to FIG. 11B, according to an embodiment, the light path changing member 540 may include the second frame member 541', the light blocking layer 542, the multi-layer collimator 543', and the buffer layer 547. The embodiment of FIG. 10B differs from FIG. 11B in that the pinhole array 543 is replaced with the multi-layer collimator 543', and detailed description thereof is omitted. The buffer layer 547 may also be applied to the embodiments of FIGS. 8B, 9B, and 10B.

Figure 12:
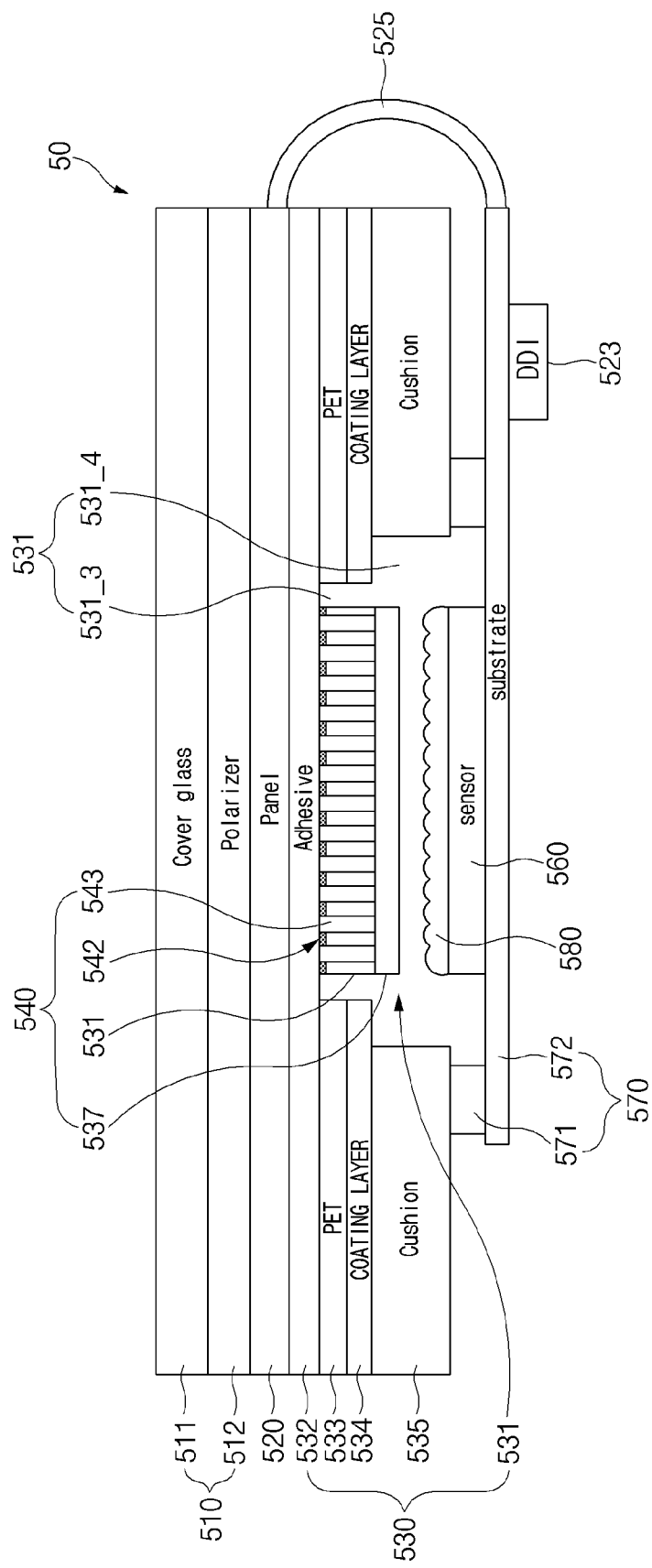
FIG. 12 illustrates a side view of an electronic device including a plurality of light path changing members according to an embodiment.

FIG. 12 illustrates a side view of an electronic device including a plurality of light path changing members according to an embodiment.

Referring to FIG. 12, according to an embodiment, the electronic device 50 includes the transparent member 510, the display panel 520, the rear panel 530, the first light path changing member 540, a second light path changing member 580, and the biometric sensor 560 (e.g., fingerprint sensor). In an embodiment, the electronic device 50 may omit some components or may further include additional components. For example, the electronic device 50 may include a printed circuit board (e.g., 220 in FIG. 2), a battery (e.g., 230 in FIG. 2), and the rear cover 240. Additionally, the electronic device 100 may further include a case provided to surround a side surface of the display module 110. Also, the electronic device 100 may further include a bracket (e.g., 150 of FIG. 1) to fix the display panel 520, the rear panel 530, the printed circuit board 220, the battery 230, or the like between the rear panel 130 and the printed circuit board 220. The bracket 150 may be provided as a part of the case (e.g., integrated with the case) or may include the case.

In an embodiment, some of the components are combined to form one entity, but the functions of the corresponding components before combining may be performed in the same way. In FIG. 12, for ease of explanation, the adhesive member 550 for fixing the light path changing member 540 to the rear panel 530 is illustrated in an omitted form. The embodiment of FIG. 12 differs from embodiment of FIG. 5A in that the plurality of light path changing members 540 are included and at least a portion of the fingerprint sensor 560 is included inside the hole 531. The difference will be mainly described in FIG. 12.

According to an embodiment, the display panel 520 may output light related to a designated image in response to control of a processor or control of a DDI based on power supplied from the battery 230. At least one side surface of a flexible printed circuit board 525 may be connected to a substrate 572 on which a display driving module 523 and the fingerprint sensor 560 are mounted. The display panel 520 may further include a DDI (or a display driving module) related to control of the display panel 520, or may be connected to the DDI. For example, the DDI may be mounted on a non-display area of the display panel 520 in a chip on glass (COP) type. The DDI disposed on the display panel 520 may be connected to the printed circuit board 220 through the flexible printed circuit board 525 and another substrate 572. The display driving module 523 (e.g., the DDI) may be disposed on at least one side of the flexible printed circuit board 525 in a COF type (Chip on film). As another example, the DDI mounted in the COF type on the flexible printed circuit board 525 may be integrally implemented.

According to an embodiment, the rear panel 530 may include, for example, the PET layer 533 where a first hole 531_3 (e.g., corresponding to the guide unit 531_1 of FIG. 6B) is formed and the cushion layer 535 including a second hole 531_4 (e.g., corresponding to the injection portion 531_4 of FIG. 6B) larger than the first hole 531_3. An adhesive layer may be further included between the PET layer 533 and the cushion layer 535 to attach the cushion layer 535 to the PET layer 533. According to the above-described embodiment, when the first light path changing member 540 is inserted into the hole 531 and then adhered to the display panel 520, that the adhesive member 550 (e.g., an elapsed liquid) affects the cushion layer 535 may be prevented by changing the size of the second hole 531_4.

According to an embodiment, the first light path changing member 540 may be attached between the display panel 520 and the fingerprint sensor 560. For example, the first light path changing member 540 may be fixed to a second surface (e.g., a back surface) of the display panel 520 by the adhesive layer 532 attached to the second surface of the display panel 520.

According to an embodiment, the first light path changing member 540 may include the frame member 541, the light blocking layer 542, the pinhole array 543, and the buffer layer 547.

The frame member 541 may be a member on which the pinhole array 543 of the first light path changing member 540 is formed. For example, the frame member 541 may be made of a metal material having a flexibility greater than a specified flexibility.

The light blocking layer 542 may block the light from entering or reflecting into a region excluding a path in which the light is condensed by the pinhole array 543. For example, the light blocking layer 542 may include a black coating layer (e.g., a black sheet or black printed layer) that is attached or applied to an upper portion of the region where the pinhole 531 of the pinhole array is not formed. The light blocking layer 542 may be formed to have a refractive index corresponding to the coating layer 534 of the rear panel 530. According to the above-described embodiment, the light blocking layer 542 may reduce occurrence of the cross talk which occurs when the light passing through the transmissive region (e.g., 310 of FIG. 3B) of the display panel 520 is reflected or diffracted again from the upper surface of the light path changing member 540.

The pinhole array 543 may condense the light transmitted through the transmissive region 310 of the display panel 520 toward the fingerprint sensor 560 (e.g., a direction perpendicular to the upper surface of the fingerprint sensor 560). For example, the pinhole array 543 may be formed on the light path changing member 540 in the same size and shape.

The buffer layer 547 may include at least one of an air gap and a PET layer. The buffer layer 547 may be attached to the first surface (e.g., the upper surface) of the first frame member 541, for example, using an adhesive layer to be disposed between the light path changing member 540 and the display panel 520. According to the above-described embodiment, the pressure may be applied to the display panel 520 when the light path changing member 540 is attached to the display panel 520 and the buffer layer 547 may absorb a part of the pressure, thereby preventing the display panel 520 from being damaged.

According to an embodiment, the second light path changing member 580 may be disposed between the first light path changing member 540 and the fingerprint sensor 560. For example, the second light path changing member 580 may be attached to the first surface (e.g., the upper surface) of the fingerprint sensor 560. The second light path changing member 580 may be configured with the same structure as the first light path changing member 540, and may be configured with a different structure. For example, the second light path changing member 580 may include a lens, a pinhole array, or a collimator.

According to an embodiment, at least a portion of the fingerprint sensor 560 may be disposed inside the hole 531. For example, a height of the hole 531 may be sufficient to include at least a portion of the first and second light path changing members 540 and 580 and the fingerprint sensor 560. When the height of the hole 531 is sufficient to secure a focal length of the fingerprint sensor 560, at least a portion of the fingerprint sensor 560 may be included in the hole 531.

According to an embodiment, the fingerprint sensor 560 may be mounted on the substrate 572 on which the DDI 523 is mounted. For example, the fingerprint sensor 560 may be mounted on the first surface of the substrate 572, and the DDI 523 may be mounted on the second surface of the substrate 572. The DDI 523 may be in electrical contact with the display panel 520 through the flexible printed circuit board 525.

According to the above-described embodiment, the electronic device 50 may use the plurality of light path changing members 540. The first light path changing member 540 may be used to prevent the crosstalk caused by diffraction of the transmitted light and the second light path changing member 580 in contact with the fingerprint sensor 560 may be used to further condense the lights passing through the first light path changing member 540. Accordingly, the electronic device 50 may allow the fingerprint sensor 560 to more easily acquire a good signal as necessary for fingerprint recognition.

Figure 13A:
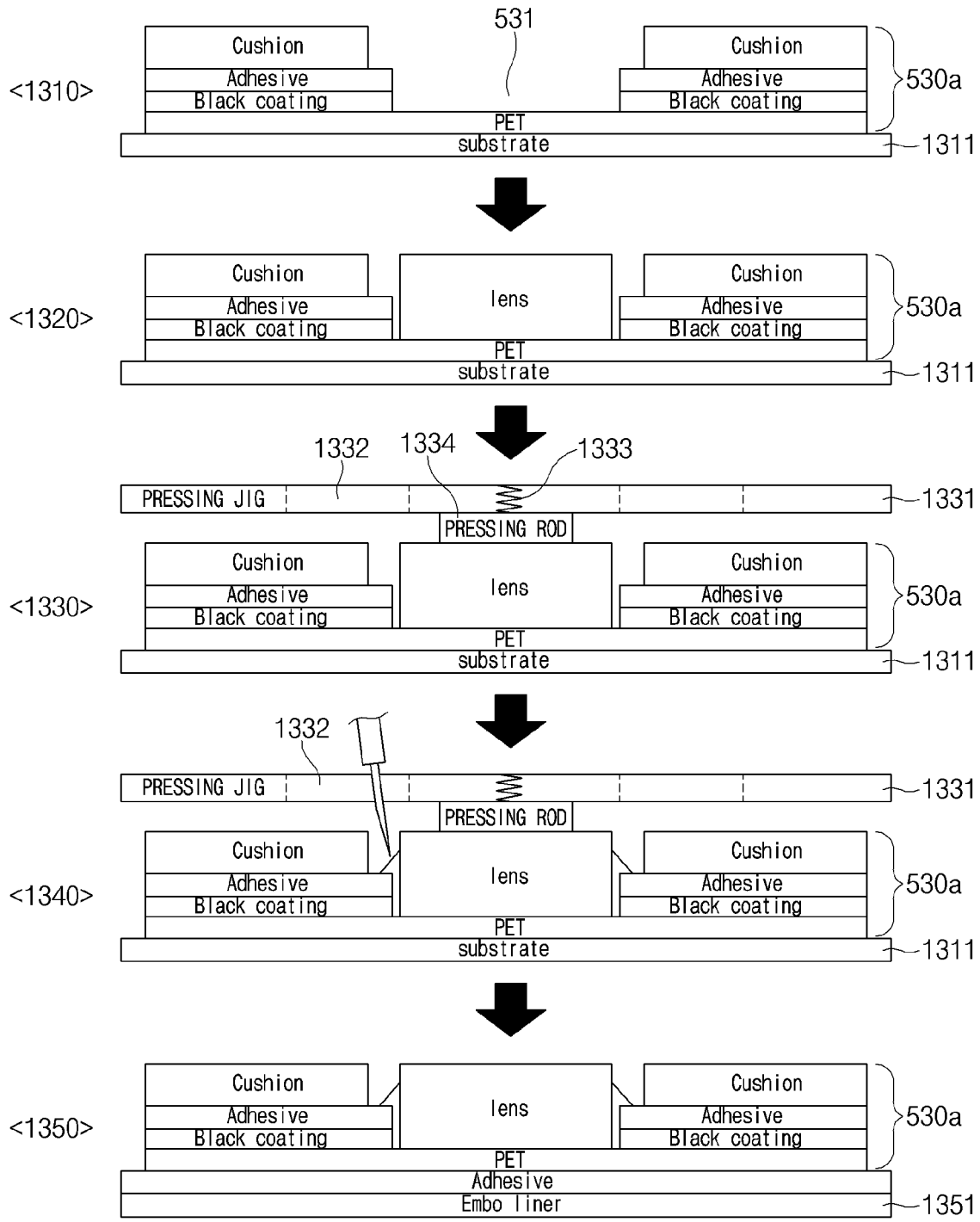
FIG. 13A is a view for explaining a method of manufacturing a rear panel according to an embodiment.

FIG. 13A is a view for explaining a method of manufacturing a rear panel according to an embodiment. FIG. 13A is an example of a method of manufacturing a rear panel having a structure according to FIG. 5A. The manufacturing method of FIG. 13A may be performed, for example, by a manual process or an automated process.

Referring to FIG. 13A, in operation 1310, a rear panel material 530a in which the hole 531 is formed may be seated on a substrate 1311. For example, a second surface (e.g., a back surface) of the cushion layer including a second hole that is larger than the first hole may be fixed to a first surface (an upper surface) of a PET layer using the adhesive layer in which the first hole is formed to form the rear panel material 530a. For another example, after a black coating layer and the adhesive layer are attached, the first hole may be formed in the black coating layer and adhesive layer and the black coating layer and adhesive layer may be attached to the PET layer 533 and cushion layer 535 in which the second hole is formed to form the rear panel material 530a. As the second hole is formed to be larger than the first hole, when the light path changing member 540 is attached to the rear cover 240, the adhesive member 550 may not affect an attachment surface of the fingerprint sensor 560 attached to the cushion layer 535. The black coating layer may be formed (e.g., applied or attached) on the first surface of the PET layer which does not face the hole 531. The hole 531 may include, for example, the first hole and the second hole.

In operation 1320, the light path changing member (a lens) may be inserted into the hole 531. The light path changing member 540 may be inserted into the hole 531 not to be biased inside the hole 531 and to be arranged in a center using, for example, the guide unit 531_2.

In operation 1330, a pressing jig 1331 may fix the light path changing member 540. The pressing jig 1331 may include a spring member 1333 and a pressing rod 1334 for applying a force for fixing the light path changing member 540 to an area facing the upper surface of the light path changing member 540. The pressing jig 1331 may further include an injection unit 1332 (e.g., an injection port) for injecting a curing liquid for fixing the light path changing member 540.

In operation 1340, the curing liquid may be applied to a side portion of the light path changing member 540 inside the hole 531 through the injection unit 1332 of the pressing jig 1331 and the curing liquid may be cured to perform fixation. The light path changing member 540 may be fixed to the PET layer 533 and black coating layer of the rear cover 240 by the curing liquid.

In operation 1350, when the curing liquid is cured, the substrate 1311 may be removed from the rear panel material 530*a* and an embossed liner 1351 may be attached to the second surface (e.g., the lower layer) of the rear panel material 530*a* using the adhesive layer. The embossed liner 1351 may be a member for forming an embossed layer having a shape specified in an adhesive layer. The embossed layer may include, for example, wavy irregularities.

Figure 13B:
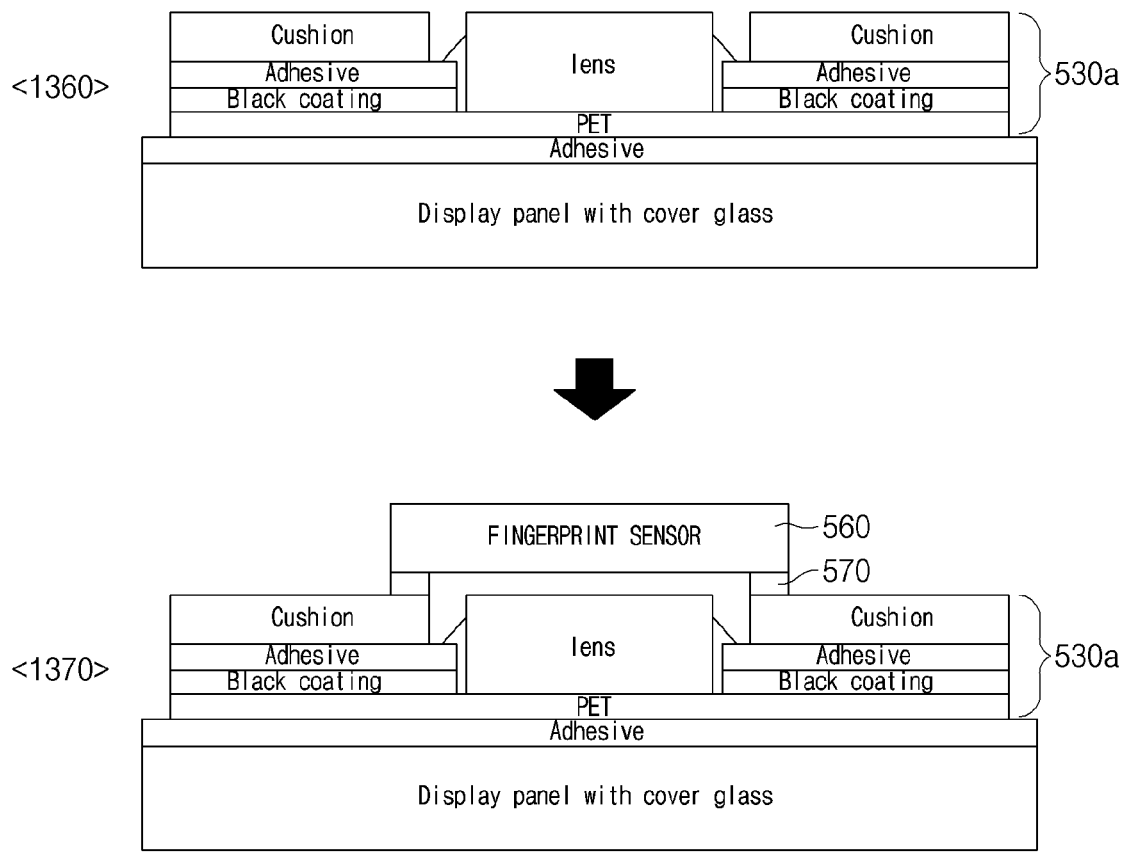
FIG. 13B is a view for explaining a method of combining a rear panel and a display according to an embodiment.

FIG. 13B is a view for explaining a method of combining a rear panel and a display according to an embodiment.

Referring to FIG. 13B, in operation 1360, after the embossed liner 1351 attached to the rear panel 530 is removed, the rear panel 530 may be attached to a display panel. An unevenness of a designated shape may be formed on the adhesive layer of the rear panel 530 from which the embossed liner 1351 is removed. The unevenness may trip air when the rear panel 530 is attached to the displays 510 and 520 to prevent a problem of lowering visibility due to the air between the rear panel 530 and the displays 510 and 520.

In operation 1370, the fingerprint sensor 560 may be attached to the cushion layer 535 of the rear panel 530. The fingerprint sensor 560 may be attached to the cushion layer 535 using an adhesive layer attached to an area (e.g., an edge area) excluding the light receiving unit of the fingerprint sensor 560.

Figure 14:
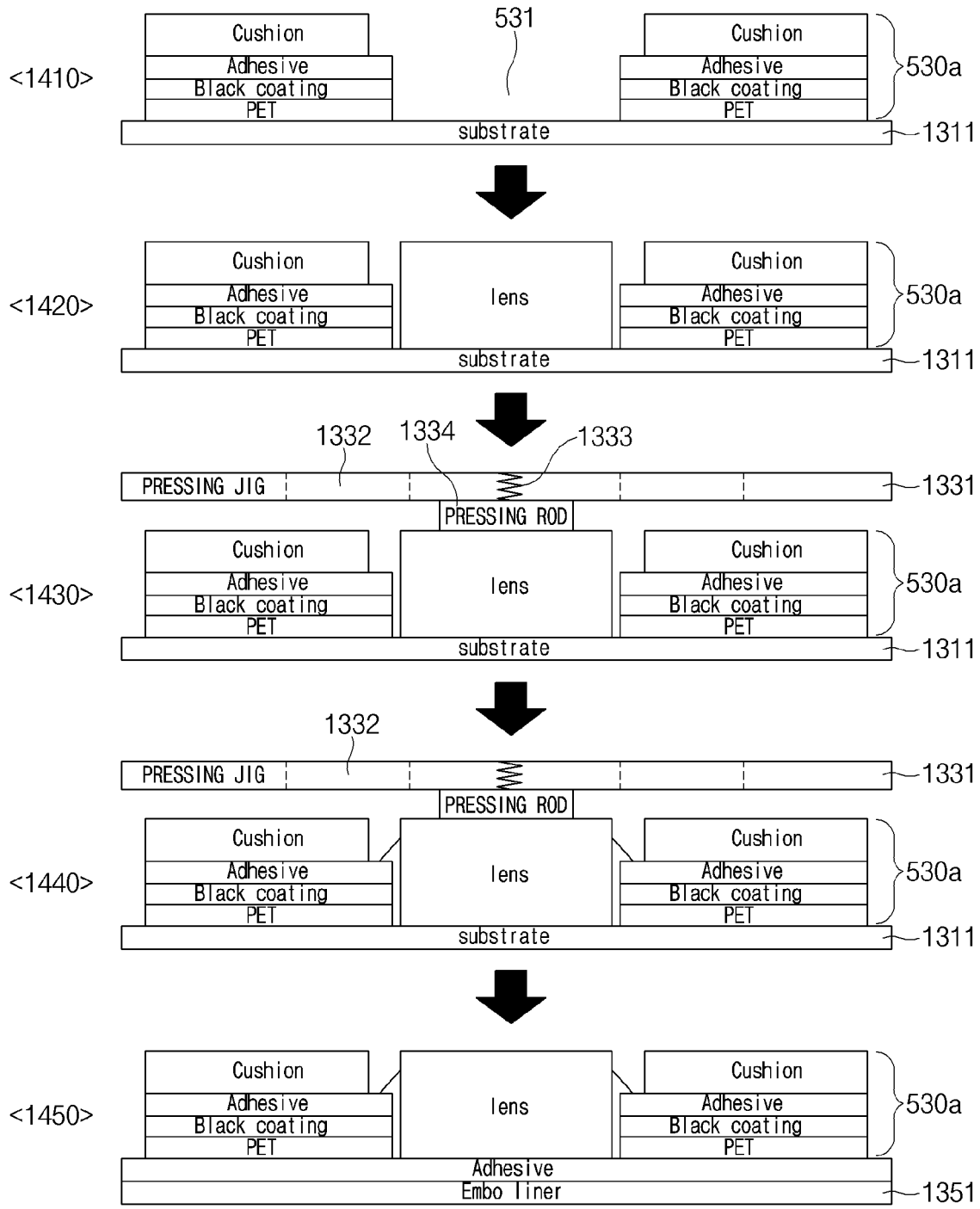
FIG. 14 is a view for explaining a method of manufacturing a rear panel according to an embodiment.

FIG. 14 is a view for explaining a method of manufacturing a rear panel according to an embodiment. FIG. 14 is an example of a method for manufacturing a rear panel having a structure according to FIG. 5B. The manufacturing method of FIG. 14 may be performed, for example, by a manual process or an automated process. FIG. 14 may be somewhat different from FIG. 13A in the structure of the rear panel material 530*a*.

Referring to FIG. 14, in operation 1410, the rear panel material 530*a* in which the hole 531 is formed may be seated on the substrate 1311. For example, a first surface (e.g., an upper surface) of a PET layer (PET) having a first hole may be fixed on a second surface (e.g., a rear surface) of the cushion layer having a second hole larger than the first hole using the adhesive layer formed with the first hole to form the rear panel material 530*a*. For another example, the first hole may be formed in a state in which the second surface of the adhesive layer is attached to the black coated PET layer 533 and the cushion layer 535 having the second hole may be attached on the first surface of the adhesive layer, and therefore the rear panel material 530*a* may be formed. As the second hole is designed larger than the first hole, the cushion layer 535 may not be affected by the adhesive member 550 attaching the light path changing member 540 to the rear cover 240. Therefore, when the light path changing member 540 is attached, it may not affect the attachment surface of the fingerprint sensor 560 attached to the cushion layer 535. A black coating may be formed (e.g., applied or attached) to a region in which the first hole of the first surface of the PET layer (PET) is not formed. The hole 531 may include, for example, a first hole and a second hole.

In operation 1420, a light path changing member (lens) may be inserted into the hole 531. The light path changing member 540 may be inserted into the hole 531 so as to be positioned in the center without biasing the inside of the hole 531 using, for example, the guide unit 531_2.

In operation 1430, the pressing jig 1331 may fix the light path changing member 540. The pressing jig 1331 may include the spring member 1333 and the pressing rod 1334 for applying a force for fixing the light path changing member 540 to an area facing the upper surface of the light path changing member 540. The pressing jig 1331 may further include the injection unit 1332 for injecting a curing liquid for fixing the light path changing member 540.

In operation 1440, the curing liquid may be applied to the side portion of the light path changing member 540 inside the hole 531 through the injection portion 1332 of the pressing jig 1331 and the curing liquid may be cured to be fixed. The light path changing member 540 may be fixed to the PET layer 533 and the black coating layer of the rear cover 240 by the curing liquid.

In operation 1450, when the curing liquid is cured, the substrate 1311 may be removed from the rear panel material 530*a* and the embossed liner 1351 may be attached to the second surface (e.g., the lower surface) of the rear panel material 530*a* using the adhesive layer. The embossed liner 1351 may be a member for forming an embossed layer having a shape specified in the adhesive layer. The embossed layer may include, for example, wavy unevenness.

In operation 1470, the fingerprint sensor 560 may be attached to the cushion layer 535 of the rear panel 530. The fingerprint sensor 560 may be attached to the cushion layer 535 using the adhesive layer attached to an area (e.g., an edge area) excluding the light receiving unit of the fingerprint sensor 560.

According to an embodiment, an electronic device (e.g., the electronic device 50 of FIG. 5A) may include a transparent member (e.g., the transparent member 510 of FIG. 5A); a display panel member (e.g., the display panel 520 of FIG. 5A) including a plurality of pixels and at least one transmissive region (e.g., the transmissive region 310 of FIG. 4) through which a light is capable of being transmitted between the plurality of pixels, and disposed under the transparent member; a biometric sensor (e.g., the fingerprint sensor 560 of FIG. 5A) disposed under the display panel and obtaining a light, which is output through at least some of the plurality of pixels, is reflected by an external object close to or in contact with the transparent member, and then is transmitted through the at least one transmissive region; and a light path changing member (e.g., the light path changing member 540 of FIG. 5A) disposed between the biometric sensor and the display panel to be spaced apart from the biometric sensor by a specific distance and capable of changing an optical path for at least a portion of the light transmitted through the at least one transmissive region.

The light path changing member may be spaced apart from the display panel by a first distance and the light path changing member may be spaced apart from the biometric sensor by a second distance exceeding the first distance.

The first distance may be set such that interference by diffraction of the transmitted light is equal to or less than a specified value.

According to an embodiment, the electronic device may further include a rear panel (e.g., the rear panel 530 of FIG. 5A) disposed between the display panel and the biometric sensor and including a hole (e.g., the hole 531 of FIG. 5A), and the light path changing member may be disposed inside the hole According to an embodiment, the electronic device may further include a first light blocking layer (e.g., the coating layer 534 of FIG. 5A) disposed between the display panel and the rear panel to block incidence or reflection of the transmitted light to an area excluding the hole, the light path changing member may include at least one hole (e.g., the pinhole array 543 of FIG. 7A) for condensing the transmitted light; and a second light blocking layer (e.g., the light blocking layer 542) that is coated on an area excluding the at least one hole and blocks incidence or reflection of the transmitted light, and the first light blocking layer may have a refractive index less than a critical difference from the second light blocking layer.

The rear panel may include a first protective layer (e.g., the adhesive layer 532, the PET layer 533, and the coating layer 534 of FIG. 5B) including a first hole (e.g., the first hole 531_3 in FIG. 12) disposed under the display panel; and a second protective layer (e.g., the cushion layer 535 in FIG. 5B) including a second hole (e.g., the second hole 531_4 in FIG. 12) disposed under the first protective layer, a size of the second hole may exceed a size of the first hole, the light path changing member may be fixed to the first protective layer using a first adhesive member, and the fingerprint sensor may be fixed to the second protective layer using a second adhesive member.

According to an embodiment, the electronic device may further include an adhesive member (e.g., the adhesive member 550 of FIG. 5A) disposed between the hole and the light path changing member, and having a refractive index less than a critical difference from a refractive index of the light path changing member or a refractive index of the rear panel.

In the light path changing member, a corner of a surface in contact with the display panel may be rounded.

The hole may include a guide unit (e.g., the guide unit 531_1 of FIG. 6B) for guiding an arrangement of the light path changing member; and an injection unit (e.g., the injection portion 531_2 in FIG. 6B) to which an adhesive member for adhering the light path changing member to the inside of the hole is injected.

When the hole is viewed from above and from the outside of the rear panel, the guide unit may be formed to correspond to the shape of a corner region of the light path changing member, and the injection unit may extend from a side surface of the light path changing member toward the outside of the side surface by a designated width.

The light path changing member may include an optical layer (e.g., the pinhole array 543 of FIG. 7A) including at least one hole for condensing the transmitted light in a direction toward the biometric sensor; and a light blocking layer (e.g., the light blocking layer 542 of FIG. 7A) disposed on the optical layer and disposed on an upper surface of the optical layer excluding the at least one hole to block incidence or reflection of the transmitted light.

The light path changing member may include a first optical layer (e.g., the first pinhole array 543_1 in FIG. 8A or the first layer collimator 543_1' in FIG. 8A) having a first angle of view and a second optical layer (e.g., the second pinhole array 543_2 in FIG. 8A or the second layer collimator 543_2' in FIG. 8A) having a second angle of view less than the first angle of view, the first optical layer and the second optical layer may be formed to connect to each other, the first optical layer may condense the transmitted light, and the second optical layer may be configured to condense the transmitted light passing through the first optical layer.

The light path changing member may include a filter layer (e.g., the filter layer 545 in FIG. 9A) blocking light in red and near infrared bands; and an optical layer (e.g., the pinhole array 543 in FIG. 9A or the multi-layer collimator 543' in FIG. 9B) disposed under the filter layer and including at least one hole for condensing the transmitted light in a direction toward the biometric sensor.

The filter layer may be spaced apart at a specific distance from a rear surface of the light path changing member to be fixed an edgeregion of the rear surface where the at least one hole is not formed.

The light path changing member may include an optical layer (e.g., the pinhole array 543 of FIG. 10A or the multi-layer collimator 543' of FIG. 10B) including at least one hole for condensing the transmitted light in a direction toward the biometric sensor; and a buffer layer (e.g., the spacer 546 of FIG. 10A or 10B) disposed between the display panel and the optical layer to be spaced apart the display panel from the optical layer at a specified distance.

According to an embodiment, the electronic device (e.g., the electronic device 50 of FIG. 5) may include a display panel including a plurality of pixels and at least one transmissive region through which a light is capable of being transmitted; a rear panel disposed under the display panel and having a hole formed therein; a light path changing member (e.g., the light path changing member 540 of FIG. 5A) at least partially disposed inside the hole and condensing a light which is output through at least some of the plurality of pixels of the display panel, is reflected by an external object close to an upper surface of the display panel, and then pass through the at least one transmissive region; and a fingerprint sensor (e.g., the fingerprint sensor 560 of FIG. 5A) disposed under the rear panel and capable of acquiring the transmitted light passing through the light path changing member.

The light path changing member may be spaced apart from the display panel by a first distance and spaced apart from the biometric sensor by a second distance exceeding the first distance.

The first distance may be set such that interference by diffraction of the transmitted light is equal to or less than a specified value.

The electronic device may further include a first light blocking layer (e.g., the coating layer 534 of FIG. 5A) disposed between the display panel and the rear panel to block incidence or reflection of the transmitted light to an area excluding the hole, the light path changing member may include at least one hole (e.g., the pinhole array 543 of FIG. 7A) for condensing the transmitted light; and a second light blocking layer (e.g., the light blocking layer 542) that is coated on an area excluding the at least one hole and blocks incidence or reflection of the transmitted light, and the first light blocking layer may have a refractive index less than a critical difference from the second light blocking layer.

The rear panel may include a first protective layer (e.g., the adhesive layer 532, the PET layer 533, and the coating layer 534 of FIG. 5B) including a first hole (e.g., the first hole 531_3 in FIG. 12) disposed under the display panel; and a second protective layer (e.g., the cushion layer 535 in FIG. 5B) including a second hole (e.g., the second hole 531_4 in FIG. 12) disposed under the first protective layer, a size of the second hole may exceed a size of the first hole, the light path changing member may be fixed to the first protective layer using a first adhesive member, and the fingerprint sensor may be fixed to the second protective layer using a second adhesive member.

Figure 15:
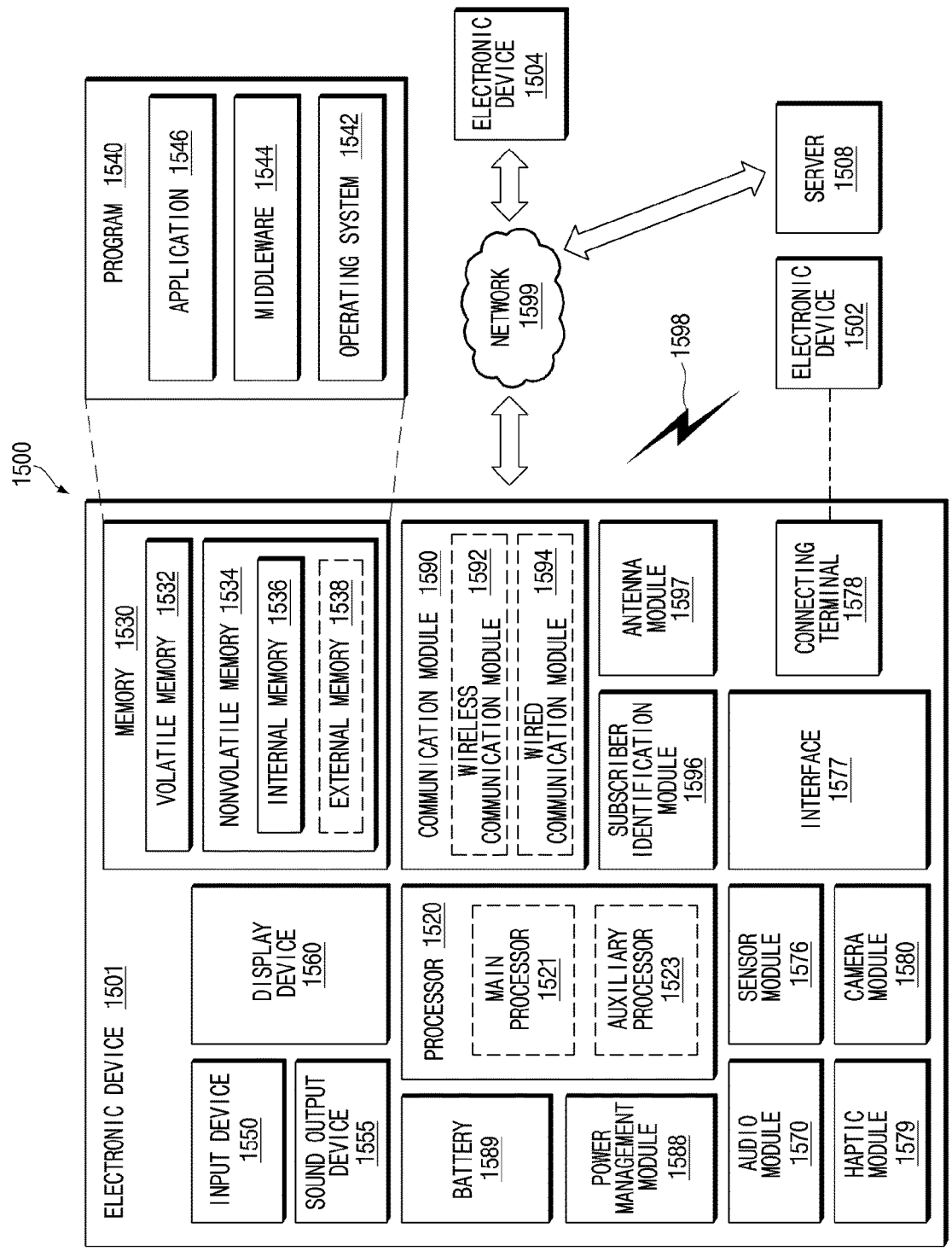
FIG. 15 is a block diagram of an electronic device in a network environment according to various embodiments.

FIG. 15 is a block diagram of an electronic device in a network environment according to various embodiments.

Referring to FIG. 15, an electronic device 1501 may communicate with an electronic device 1502 through a first network 1598 (e.g., a short-range wireless communication) or may communicate with an electronic device 1504 or a server 1508 through a second network 1599 (e.g., a long-distance wireless communication) in a network environment 1500. According to an embodiment, the electronic device 1501 may communicate with the electronic device 1504 through the server 1508. According to an embodiment, the electronic device 1501 may include a processor 1520, a memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module 1596, and an antenna module 1597. According to some embodiments, at least one (e.g., the display device 1560 or the camera module 1580) among components of the electronic device 1501 may be omitted or other components may be added to the electronic device 1501. According to some embodiments, some components may be integrated and implemented as in the case of the sensor module 1576 (e.g., a fingerprint sensor, an iris sensor, or an illuminance sensor) embedded in the display device 1560 (e.g., a display).

The processor 1520 may operate, for example, software (e.g., a program 1540) to control at least one of other components (e.g., a hardware or software component) of the electronic device 1501 connected to the processor 1520 and may process and compute a variety of data. The processor 1520 may load a command set or data, which is received from other components (e.g., the sensor module 1576 or the communication module 1590), into a volatile memory 1532, may process the loaded command or data, and may store result data into a nonvolatile memory 1534. According to an embodiment, the processor 1520 may include a main processor 1521 (e.g., a central processing unit or an application processor) and an auxiliary processor 1523 (e.g., a graphic processing device, an image signal processor, a sensor hub processor, or a communication processor), which operates independently from the main processor 1521, additionally or alternatively uses less power than the main processor 1521, or is specified to a designated function. In this case, the auxiliary processor 1523 may operate separately from the main processor 1521 or embedded.

In this case, the auxiliary processor 1523 may control, for example, at least some of functions or states associated with at least one component (e.g., the display device 1560, the sensor module 1576, or the communication module 1590) among the components of the electronic device 1501 instead of the main processor 1521 while the main processor 1521 is in an inactive (e.g., sleep) state or together with the main processor 1521 while the main processor 1521 is in an active (e.g., an application execution) state. According to an embodiment, the auxiliary processor 1523 (e.g., the image signal processor or the communication processor) may be implemented as a part of another component (e.g., the camera module 1580 or the communication module 1590) that is functionally related to the auxiliary processor 1523. The memory 1530 may store a variety of data used by at least one component (e.g., the processor 1520 or the sensor module 1576) of the electronic device 1501, for example, software (e.g., the program 1540) and input data or output data with respect to commands associated with the software. The memory 1530 may include the volatile memory 1532 or the nonvolatile memory 1534.

The program 1540 may be stored in the memory 1530 as software and may include, for example, an operating system 1542, a middleware 1544, or an application 1546.

The input device 1550 may be a device for receiving a command or data, which is used for a component (e.g., the processor 1520) of the electronic device 1501, from an outside (e.g., a user) of the electronic device 1501 and may include, for example, a microphone, a mouse, or a keyboard.

The sound output device 1555 may be a device for outputting a sound signal to the outside of the electronic device 1501 and may include, for example, a speaker used for general purposes, such as multimedia play or recordings play, and a receiver used only for receiving calls. According to an embodiment, the receiver and the speaker may be either integrally or separately implemented.

The display device 1560 may be a device for visually presenting information to the user of the electronic device 1501 and may include, for example, a display, a hologram device, or a projector and a control circuit for controlling a corresponding device. According to an embodiment, the display device 1560 may include a touch circuitry or a pressure sensor for measuring an intensity of pressure on the touch.

The audio module 1570 may convert a sound and an electrical signal in dual directions. According to an embodiment, the audio module 1570 may obtain the sound through the input device 1550 or may output the sound through an external electronic device (e.g., the electronic device 1502 (e.g., a speaker or a headphone)) wired or wirelessly connected to the sound output device 1555 or the electronic device 1501.

The sensor module 1576 may generate an electrical signal or a data value corresponding to an operating state (e.g., power or temperature) inside or an environmental state outside the electronic device 1501. The sensor module 1576 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1577 may support a designated protocol wired or wirelessly connected to the external electronic device (e.g., the electronic device 1502). According to an embodiment, the interface 1577 may include, for example, an HDMI (high-definition multimedia interface), a USB (universal serial bus) interface, an SD card interface, or an audio interface.

A connecting terminal 1578 may include a connector that physically connects the electronic device 1501 to the external electronic device (e.g., the electronic device 1502), for example, an HDMI connector, a USB connector, an SD card connector, or an audio connector (e.g., a headphone connector).

The haptic module 1579 may convert an electrical signal to a mechanical stimulation (e.g., vibration or movement) or an electrical stimulation perceived by the user through tactile or kinesthetic sensations. The haptic module 1579 may include, for example, a motor, a piezoelectric element, or an electric stimulator.

The camera module 1580 may shoot a still image or a video image. According to an embodiment, the camera module 1580 may include, for example, at least one lens, an image sensor, an image signal processor, or a flash.

The power management module 1588 may be a module for managing power supplied to the electronic device 1501 and may serve as at least a part of a power management integrated circuit (PMIC).

The battery 1589 may be a device for supplying power to at least one component of the electronic device 1501 and may include, for example, a non-rechargeable (primary) battery, a rechargeable (secondary) battery, or a fuel cell.

The communication module 1590 may establish a wired or wireless communication channel between the electronic device 1501 and the external electronic device (e.g., the electronic device 1502, the electronic device 1504, or the server 1508) and support communication execution through the established communication channel. The communication module 1590 may include at least one communication processor operating independently from the processor 1520 (e.g., the application processor) and supporting the wired communication or the wireless communication. According to an embodiment, the communication module 1590 may include a wireless communication module 1592 (e.g., a cellular communication module, a short-range wireless communication module, or a GNSS (global navigation satellite system) communication module) or a wired communication module 1594 (e.g., an LAN (local area network) communication module or a power line communication module) and may communicate with the external electronic device using a corresponding communication module among them through the first network 1598 (e.g., the short-range communication network such as a Bluetooth, a WiFi direct, or an IrDA (infrared data association)) or the second network 1599 (e.g., the long-distance wireless communication network such as a cellular network, an internet, or a computer network (e.g., LAN or WAN)). The above-mentioned various communication modules 1590 may be implemented into one chip or into separate chips, respectively.

According to an embodiment, the wireless communication module 1592 may identify and authenticate the electronic device 1501 using user information stored in the subscriber identification module 1596 in the communication network.

The antenna module 1597 may include one or more antennas to transmit or receive the signal or power to or from an external source. According to an embodiment, the communication module 1590 (e.g., the wireless communication module 1592) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1501 and the external electronic device 1504 through the server 1508 connected to the second network 1599. Each of the electronic devices 1502 and 1504 may be the same as or different types as or from the electronic device 1501. According to an embodiment, all or some of the operations performed by the electronic device 1501 may be performed by another electronic device or a plurality of external electronic devices. When the electronic device 1501 performs some functions or services automatically or by request, the electronic device 1501 may request the external electronic device to perform at least some of the functions related to the functions or services, in addition to or instead of performing the functions or services by itself. The external electronic device receiving the request may carry out the requested function or the additional function and transmit the result to the electronic device 1501. The electronic device 1501 may provide the requested functions or services based on the received result as is or after additionally processing the received result. To this end, for example, a cloud computing, distributed computing, or client-server computing technology may be used.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1540) including an instruction stored in a machine-readable storage media (e.g., an internal memory 1536 or an external memory 1538) readable by a machine (e.g., a computer). The machine may be a device that calls the instruction from the machine-readable storage media and operates depending on the called instruction and may include the electronic device (e.g., the electronic device 1501). When the instruction is executed by the processor (e.g., the processor 1520), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a transparent member;
a display panel configured to include a plurality of pixels and at least one transmissive region through which a light is capable of being transmitted between the plurality of pixels, and to be disposed under the transparent member;
a biometric sensor configured to be disposed under the display panel and to obtain a light, which is output through at least some of the plurality of pixels, is reflected by an external object close to or in contact with the transparent member, and then is transmitted through the at least one transmissive region; and
a light path changing member configured to be disposed between the biometric sensor and the display panel to be spaced apart from the biometric sensor by a specific distance and capable of changing an optical path for at least a portion of the light transmitted through the at least one transmissive region,
wherein the light path changing member is spaced apart from the display panel by a first distance, and
wherein the first distance is set such that interference by diffraction of the transmitted light is equal to or less than a specified value.

2. The electronic device of claim 1,
wherein the light path changing member is spaced apart from the biometric sensor by a second distance exceeding the first distance.

3. The electronic device of claim 1, further comprising:
a rear panel configured to be disposed between the display panel and the biometric sensor and to include a hole,
wherein the light path changing member is disposed inside the hole.

4. The electronic device of claim 3, further comprising:
a first light blocking layer configured to be disposed between the display panel and the rear panel to block incidence or reflection of the transmitted light to an area excluding the hole,
wherein the light path changing member includes:
at least one hole for condensing the transmitted light; and
a second light blocking layer that is coated on an area excluding the at least one hole and blocks incidence or reflection of the transmitted light, and
wherein the first light blocking layer has a refractive index less than a critical difference from the second light blocking layer.

5. The electronic device of claim 3, wherein the rear panel includes:
a first protective layer including a first hole disposed under the display panel; and
a second protective layer including a second hole disposed under the first protective layer,
wherein a size of the second hole exceeds a size of the first hole,
wherein the light path changing member is fixed to the first protective layer using a first adhesive member, and
wherein the biometric sensor is fixed to the second protective layer using a second adhesive member.

6. The electronic device of claim 3, further comprising:
an adhesive member configured to be disposed between the hole and the light path changing member, and to have a refractive index less than a critical difference from a refractive index of the light path changing member or a refractive index of the rear panel.

7. The electronic device of claim 3, wherein in the light path changing member, a corner of a surface in contact with the display panel is rounded.

8. The electronic device of claim 3, wherein the hole includes:
a guide unit for guiding an arrangement of the light path changing member; and
an injection unit to which an adhesive member for adhering the light path changing member to the inside of the hole is injected.

9. The electronic device of claim 8, wherein, when the hole is viewed from above and from an outside of the rear panel;
the guide unit is formed to correspond to a shape of a corner region of the light path changing member, and
the injection unit extends from a side surface of the light path changing member toward an outside of the side surface by a designated width.

10. The electronic device of claim 1, wherein the light path changing member includes:
an optical layer including at least one hole for condensing the transmitted light in a direction toward the biometric sensor; and
a light blocking layer disposed on the optical layer and disposed on an upper surface of the optical layer excluding the at least one hole to block incidence or reflection of the transmitted light.

11. The electronic device of claim 1, wherein the light path changing member includes a first optical layer having a first angle of view and a second optical layer having a second angle of view less than the first angle of view,
wherein the first optical layer and the second optical layer are formed to connect to each other,
wherein the first optical layer condenses the transmitted light, and
wherein the second optical layer is configured to condense the transmitted light passing through the first optical layer.

12. The electronic device of claim 1, wherein the light path changing member includes:
a filter layer blocking light in red and near infrared bands; and
an optical layer disposed under the filter layer and including at least one hole for condensing the transmitted light in a direction toward the biometric sensor.

13. The electronic device of claim 12, wherein the filter layer is spaced apart at a specific distance from a rear surface of the light path changing member to be fixed to an edge region of the rear surface where the at least one hole is not formed.

14. The electronic device of claim 1, wherein the light path changing member includes:
an optical layer including at least one hole for condensing the transmitted light in a direction toward the biometric sensor; and
a buffer layer disposed between the display panel and the optical layer to space apart the display panel from the optical layer at a specified distance.

* * * * *